United States Patent
Miyamoto et al.

(10) Patent No.: US 11,119,609 B2
(45) Date of Patent: Sep. 14, 2021

(54) ELECTRONIC DEVICE

(71) Applicant: FUJITSU LIMITED, Kawasaki (JP)

(72) Inventors: Akinori Miyamoto, Sagamihara (JP); Kiyoshi Taninaka, Ebina (JP); Yuichi Kamata, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/149,781

(22) Filed: Jan. 15, 2021

(65) Prior Publication Data

US 2021/0141473 A1    May 13, 2021

Related U.S. Application Data

(63) Continuation of application No. PCT/JP2018/030039, filed on Aug. 10, 2018.

(51) Int. Cl.
     *G06F 3/043*      (2006.01)

(52) U.S. Cl.
     CPC .................. *G06F 3/043* (2013.01)

(58) Field of Classification Search
     None
     See application file for complete search history.

(56) References Cited

U.S. PATENT DOCUMENTS

| | | |
|---|---|---|
| 2002/0175902 A1 | 11/2002 | Hisasue |
| 2013/0120247 A1 | 5/2013 | Imai et al. |
| 2016/0209923 A1* | 7/2016 | Miyamoto ............ G06F 1/1637 |
| 2019/0324545 A1 | 10/2019 | Miyamoto et al. |

FOREIGN PATENT DOCUMENTS

| | | |
|---|---|---|
| JP | 2002-304252 A | 10/2002 |
| JP | 2012-207509 A | 10/2012 |
| JP | 2016-133906 A | 7/2016 |
| WO | 2012/011321 A1 | 1/2012 |
| WO | 2018/134938 A1 | 7/2018 |

OTHER PUBLICATIONS

International Search Report and Written Opinion of the International Searching Authority (Form PCT/ISA/210, 220, and 237), mailed in connection with PCT/JP2018/030039 and dated Sep. 11, 2015 (Total 8 pages).
Extended European Search Report dated Jul. 13, 2021 for corresponding European Patent Application No. 18929261.8, 7 pages.
*Please note US-2016/0209923-A1 cited herewith, was previously cited in an IDS filed on Jan. 15, 2021.*.

* cited by examiner

*Primary Examiner* — Aneeta Yodichkas
(74) *Attorney, Agent, or Firm* — Fujitsu Patent Center

(57) ABSTRACT

An electronic device includes: a top panel with an operation surface; a coordinate detector that detects coordinates of operational input performed on the operation surface; a vibrating element that generates vibration on the operation surface; a drive controller that drives the vibrating element with a drive signal that generates natural vibration in an ultrasonic band on the operation surface, the drive controller driving the vibrating element so that intensity of the natural vibration changes depending on a position of the operational input on the operation surface and a degree of temporal change in the position; and a reflector disposed on the operation surface side of the top panel and having a reflective surface that reflects ultrasonic waves radiated from the top panel.

6 Claims, 22 Drawing Sheets

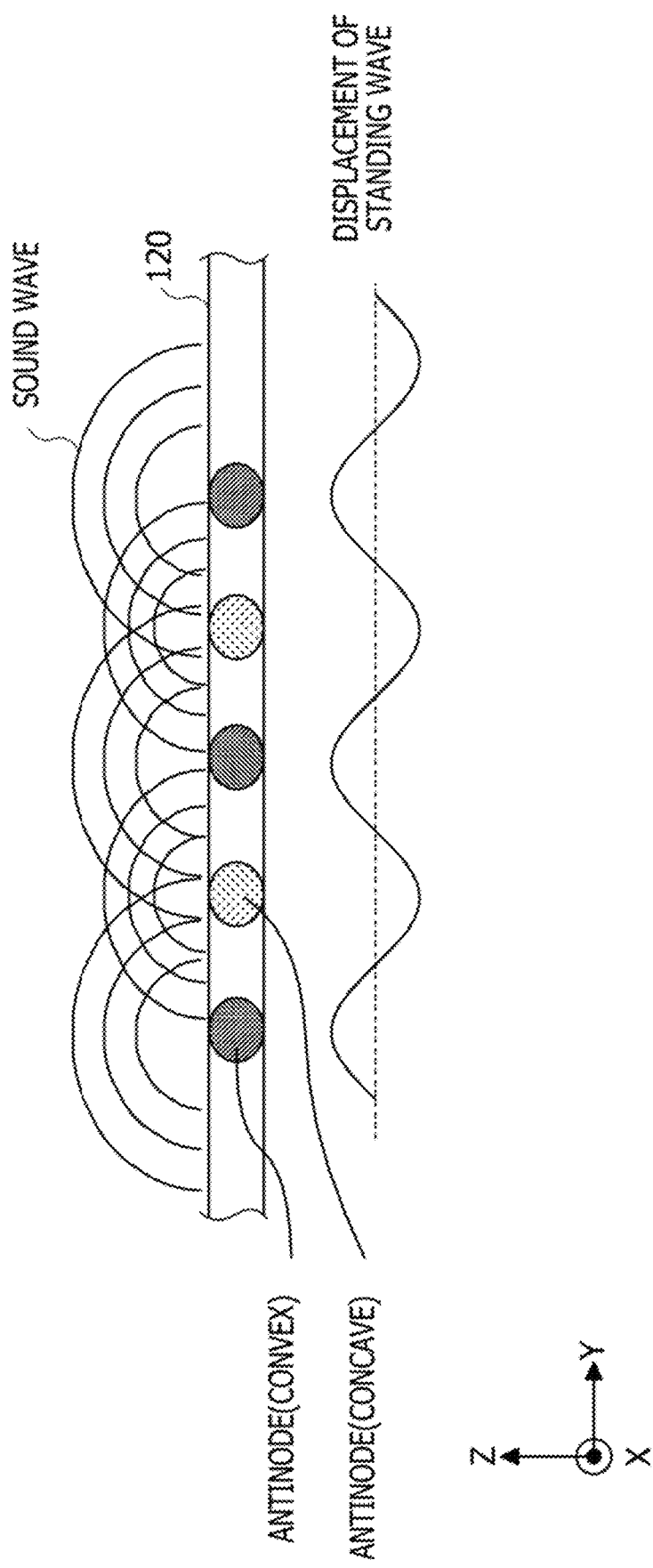

FIG. 18

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
|  |  |  |

ELECTRONIC DEVICE

CROSS-REFERENCE TO RELATED APPLICATION

This application is a continuation application of International Application PCT/JP2018/030039 filed on Aug. 10, 2018 and designated the U.S., the entire contents of which are incorporated herein by reference.

FIELD

The embodiment relates to an electronic device.

BACKGROUND

There is a digitizer including a transmitter that transmits infrared light and ultrasonic waves and a receiving sensor that receives the infrared light and the ultrasonic waves transmitted from the transmitter, and measuring a distance to the transmitter from an arrival time difference between the infrared light and the ultrasonic waves received by the receiving sensor. In order to stably receive a wide range of ultrasonic waves, a member having a hole smaller than a receiving part of an ultrasonic sensor that receives the ultrasonic waves is placed in front of the receiving part, and a conical reflector is provided above or below the hole of the member.

Related art is disclosed in Japanese Laid-open Patent Publication No. 2002-304252.

SUMMARY

According to an aspect of the embodiments, an electronic device includes: a top panel with an operation surface; a coordinate detector that detects coordinates of operational input performed on the operation surface; a vibrating element that generates vibration on the operation surface; a drive controller that drives the vibrating element with a drive signal that generates natural vibration in an ultrasonic band on the operation surface, the drive controller driving the vibrating element so that intensity of the natural vibration changes depending on a position of the operational input on the operation surface and a degree of temporal change in the position; and a reflector disposed on the operation surface side of the top panel and having a reflective surface that reflects ultrasonic waves radiated from the top panel, wherein assuming that a wavelength of a standing wave generated in the top panel by the natural vibration is λp, a wavelength of an ultrasonic wave in the air at a frequency in the ultrasonic band of the drive signal is λa, an angle that satisfies cos θ=λa/λp is θ, and N is an arbitrary positive integer, an angle formed by the reflective surface and the operation surface is about (90−θ) degrees, and a distance PQ from a position P of an antinode of the natural vibration to a point Q lowered perpendicularly to the reflective surface is about (λa/2)×(N+½).

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating antinodes of the standing wave generated in the top panel and ultrasonic waves radiated from the top panel.

FIG. 18 is a table illustrating data to be stored in a memory.

DESCRIPTION OF EMBODIMENTS

By the way, in the digitizer, reception becomes unstable when ultrasonic waves received directly from the transmitter by the receiving sensor and ultrasonic waves received after being transmitted from the transmitter and reflected by a board cancel each other out. Thus, the reception is stabilized by canceling the ultrasonic waves reflected by the board by the reflector.

For this reason, the digitizer does not suppress radiation of the ultrasonic waves.

Therefore, an electronic device that suppresses radiation of ultrasonic waves may be provided.

Hereinafter, an embodiment to which an electronic device of the present invention is applied will be described.

Embodiment

Figure 1:
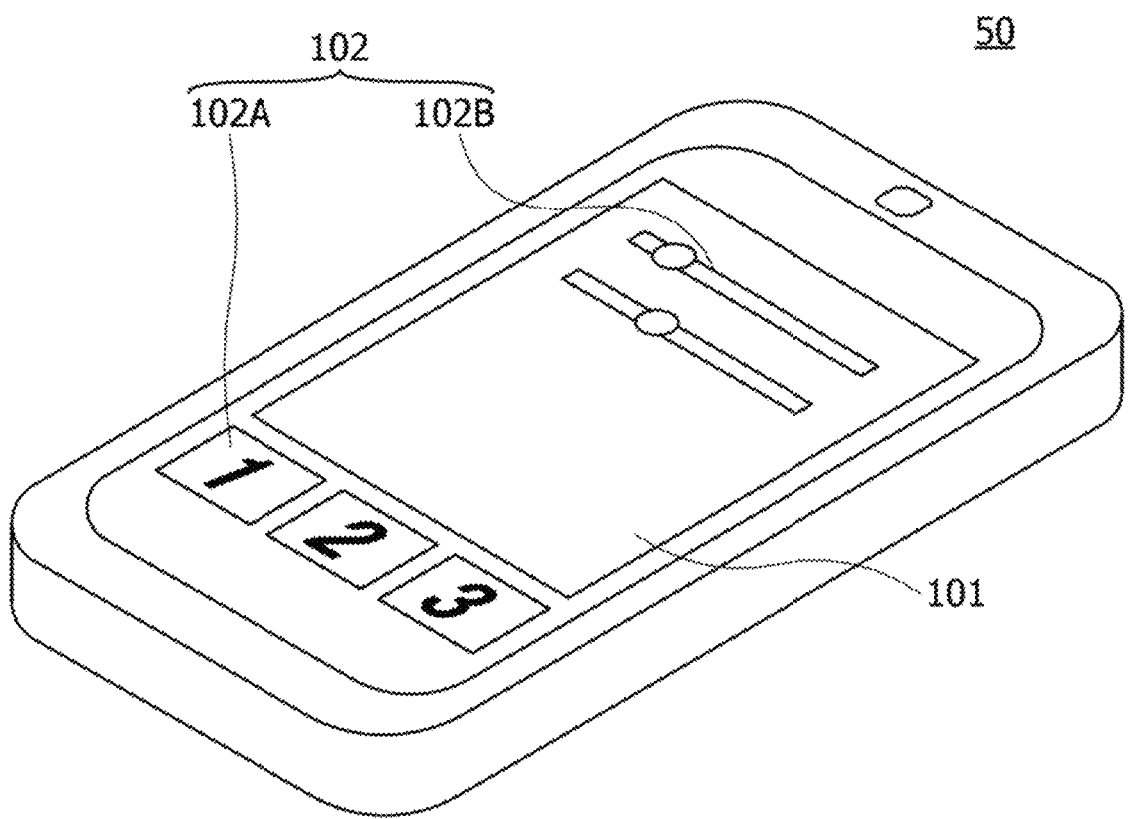
FIG. 1 is a perspective view illustrating an electronic device of a prerequisite technology.

Before the electronic device of the embodiment is described, an electronic device 50 of a prerequisite technology will be described. FIG. 1 is a perspective view illustrating the electronic device 50 of the prerequisite technology.

Examples of the electronic device 50 include a smartphone terminal, a tablet computer, a game machine, or the like using a touch panel as an input operation unit. Since it is sufficient if the electronic device 50 is a device using a touch panel as an input operation unit, it may be, for example, a mobile information terminal, or a device installed and used at a specific place, such as an automatic teller machine (ATM). Furthermore, the electronic device 50 may be an in-vehicle input device.

The electronic device 50 includes an input operation unit 101 in which a display panel is disposed below the touch panel, and various buttons 102A, sliders 102B, or the like using a graphic user interface (GUI) (hereinafter referred to as GUI operation unit 102) are displayed on the display panel.

A user of the electronic device 50 normally touches the input operation unit 101 with his/her fingertip to operate the GUI operation unit 102.

Next, a specific configuration of the electronic device 50 will be described with reference to FIG. 2.

Figure 2:
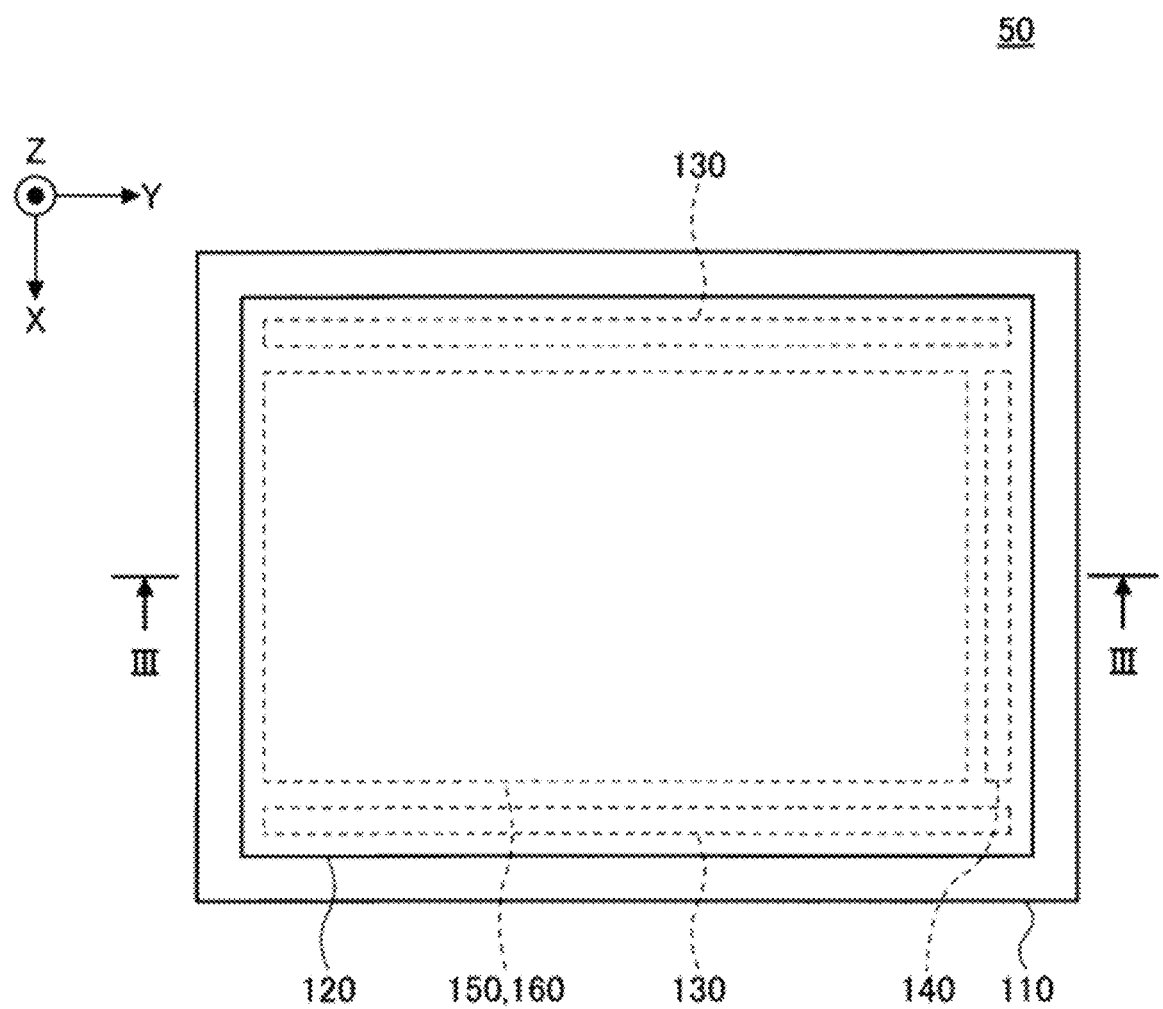
FIG. 2 is a plan view illustrating an electronic device according to an embodiment.
Figure 3:
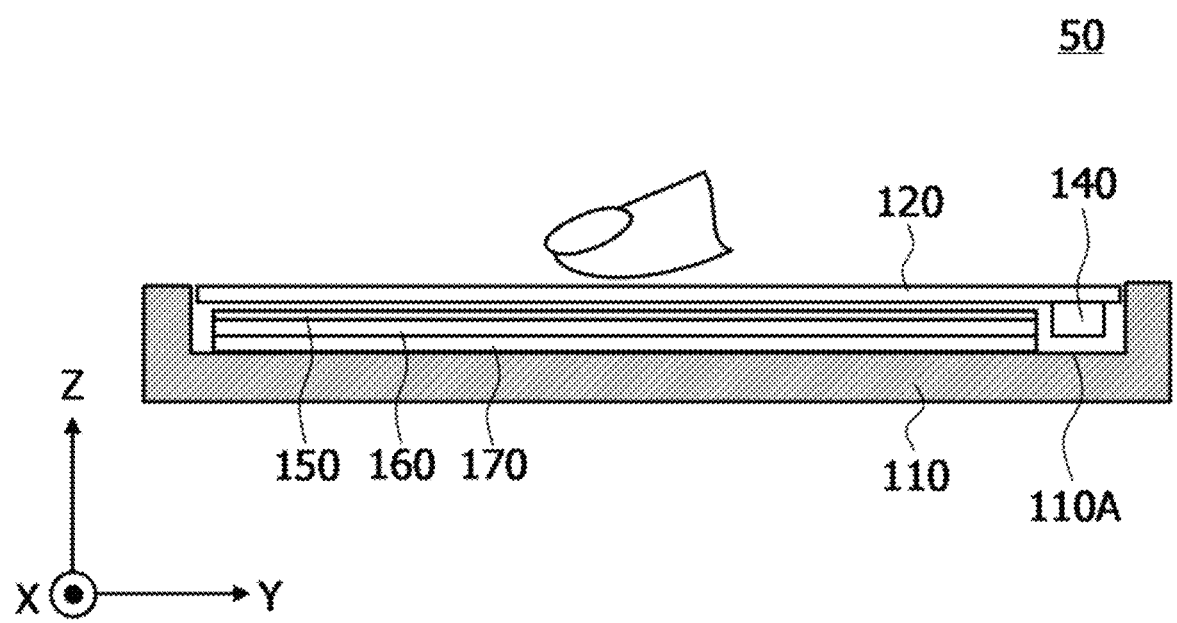
FIG. 3 is a diagram illustrating a cross section with arrows taken along line III-III of the electronic device illustrated in FIG. 2.

FIG. 2 is a plan view illustrating the electronic device 50 according to the embodiment, and FIG. 3 is a diagram illustrating a cross section with arrows taken along line III-III of the electronic device 50 illustrated in FIG. 2. Note that an XYZ coordinate system, which is an orthogonal coordinate system, is defined as illustrated in FIGS. 2 and 3.

The electronic device 50 includes a housing 110, a top panel 120, a double-sided tape 130, a vibrating element 140, a touch panel 150, a display panel 160, and a substrate 170.

The housing 110 is made of, for example, resin, and as illustrated in FIG. 3, the substrate 170, the display panel 160, and the touch panel 150 are disposed in a recess 110A. The top panel 120 is bonded by the double-sided tape 130.

The top panel 120 is a thin tabular member that is rectangular in a plan view, and is made of transparent glass or plastic, such as polycarbonate. A surface (surface on a Z-axis positive direction side) of the top panel 120 is an example of an operation surface on which the user of the electronic device 50 performs operational input.

The vibrating element 140 is bonded to a surface of the top panel 120 on a Z-axis negative direction side, and two sides of the top panel 120 parallel to a Y-axis direction are bonded to the housing 110 by the double-sided tape 130. Note that the double-sided tape 130 only needs to be capable of bonding the top panel 120 to the housing 110, and does not need to fix only the two sides as illustrated in FIG. 2. The double-sided tape 130 may have, for example, a rectangular loop shape along four sides of the top panel 120 in a plan view.

The touch panel 150 is disposed on the Z-axis negative direction side of the top panel 120. The top panel 120 is provided to protect a surface of the touch panel 150. Note that another panel, a protective film, or the like may be further provided on the surface of the top panel 120.

The top panel 120 vibrates when the vibrating element 140 is driven in a state where the vibrating element 140 is bonded to the surface on the Z-axis negative direction side. In the embodiment, the top panel 120 is vibrated at a natural vibration frequency of the top panel 120 to generate standing waves in the top panel 120. However, since the vibrating element 140 is bonded to the top panel 120, it is practically preferable to determine the natural vibration frequency in consideration of weight of the vibrating element 140 and the like.

The vibrating element 140 is bonded to the surface of the top panel 120 on the Z-axis negative direction side along a short side extending in an X-axis direction on a Y-axis positive direction side. The vibrating element 140 is only required to be an element capable of generating vibration in an ultrasonic band, and for example, an element including a piezoelectric element, such as a piezo element, can be used.

The vibrating element 140 is driven by a drive signal output from a drive control unit described later. Amplitude (intensity) and a frequency of the vibration generated by the vibrating element 140 are set by the drive signal. In addition, on/off of the vibrating element 140 is controlled by the drive signal.

Note that the ultrasonic band refers to a frequency band of about 20 kHz or more, for example. In the electronic device 50 according to the embodiment, the frequency at which the vibrating element 140 vibrates is equal to a frequency of the top panel 120, whereby the vibrating element 140 is driven by the drive signal to vibrate at the natural frequency of the top panel 120.

The touch panel 150 is disposed on the display panel 160 (Z-axis positive direction side) and under the top panel 120 (Z-axis negative direction side). The touch panel 150 is an exemplary coordinate detection unit that detects a position at which the user of the electronic device 50 touches the top panel 120 (hereinafter referred to as a position of operational input).

Various buttons and the like using the GUI (hereinafter referred to as GUI operation unit) are displayed on the display panel 160 under the touch panel 150. Accordingly, the user of the electronic device 50 normally touches the top panel 120 with his/her fingertip to operate the GUI operation unit.

The touch panel 150 is only required to be a coordinate detection unit capable of detecting the position of the operational input on the top panel 120 by the user, and may be, for example, a capacitive or resistive coordinate detection unit. Here, a mode in which the touch panel 150 is a capacitive coordinate detection unit will be described. The capacitive touch panel 150 can detect operational input to the top panel 120 even if there is a gap between the touch panel 150 and the top panel 120.

Furthermore, although a mode in which the top panel 120 is disposed on an input surface side of the touch panel 150 will be described here, the top panel 120 may be integrated with the touch panel 150. In that case, the surface of the touch panel 150 serves as the surface of the top panel 120 illustrated in FIGS. 2 and 3, which constitutes an operation surface. Furthermore, the top panel 120 illustrated in FIGS. 2 and 3 may be omitted in the configuration. In that case as well, the surface of the touch panel 150 constitutes an operation surface. Furthermore, in that case, it is sufficient if a member having the operation surface is vibrated by natural vibration of the member.

Furthermore, in a case where the touch panel 150 is resistive, the touch panel 150 may be disposed on the top panel 120. In that case as well, the surface of the touch panel 150 constitutes an operation surface. Furthermore, in a case where the touch panel 150 is capacitive, the top panel 120 illustrated in FIGS. 2 and 3 may be omitted from the configuration. In that case as well, the surface of the touch panel 150 constitutes an operation surface. Furthermore, in that case, it is sufficient if a member having the operation surface is vibrated by natural vibration of the member.

The display panel 160 only needs to be a display unit capable of displaying an image, such as a liquid crystal display panel and an organic electroluminescence (EL) panel, for example. The display panel 160 is disposed on the substrate 170 (Z-axis positive direction side) using a holder and the like (not illustrated) inside the recess 110A of the housing 110.

The display panel 160 is driven and controlled by a driver integrated circuit (IC) to be described later, and displays the GUI operation unit, an image, a character, a symbol, a figure, and the like depending on an operation status of the electronic device 50.

The substrate 170 is disposed inside the recess 110A of the housing 110. The display panel 160 and the touch panel 150 are disposed on the substrate 170. The display panel 160 and the touch panel 150 are fixed to the substrate 170 and the housing 110 by a holder and the like (not illustrated).

In addition to the drive control device to be described later, various circuits and the like necessary to drive the electronic device 50 are mounted on the substrate 170.

In the electronic device 50 having the configuration as described above, when the user touches the top panel 120 with his/her finger and the movement of the fingertip is detected, the drive control unit mounted on the substrate 170 drives the vibrating element 140 and vibrates the top panel 120 at the frequency in the ultrasonic band. The frequency in the ultrasonic band is a resonance frequency of a resonance system including the top panel 120 and the vibrating element 140, which generates standing waves in the top panel 120.

By generating standing waves in the ultrasonic band, the electronic device 50 provides a tactile sensation to the user through the top panel 120.

Next, the standing wave to be generated in the top panel 120 will be described with reference to FIGS. 4A and 4B.

Figures 4A, 4B:
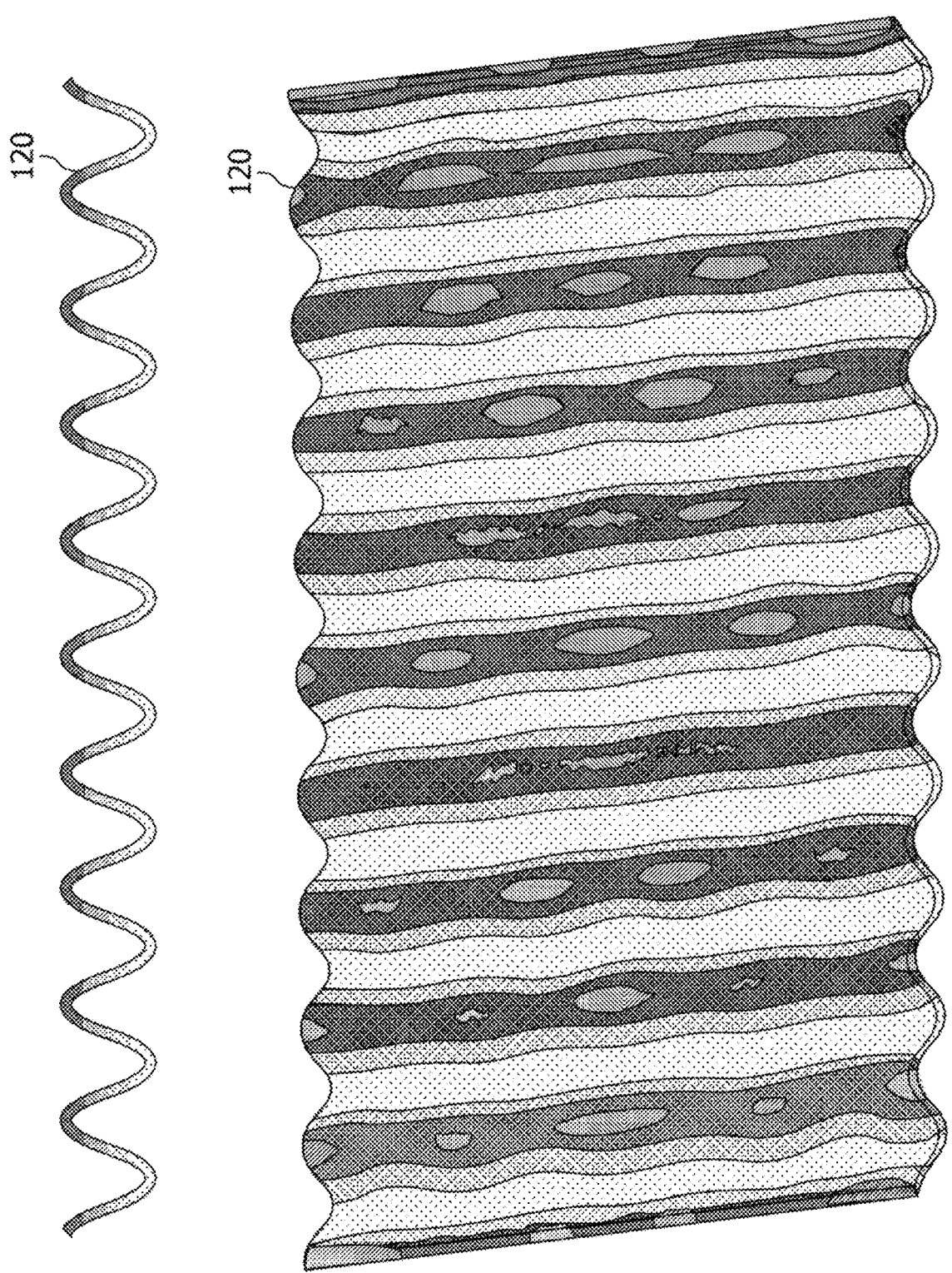
FIGS. 4A and 4B are a diagram illustrating a wave head of a standing wave generated in a top panel by natural vibration in an ultrasonic band.

FIGS. 4A and 48 are a diagram illustrating a wave head formed in parallel to the short side of the top panel 120 among the standing waves generated in the top panel 120 by natural vibration in the ultrasonic band. FIG. 4A is a side view, and FIG. 4B is a perspective view. In FIGS. 4A and 4B, XYZ coordinates similar to those in FIGS. 2 and 3 are defined. Note that FIGS. 4A and 4B illustrate amplitude of the standing wave in an exaggerated manner for easy understanding. Furthermore, the vibrating element 140 is omitted from FIGS. 4A and 4B.

A natural frequency (resonance frequency) f of the top panel 120 is expressed by the following formulae (1) and (2) using a Young's modulus E, density ρ, a Poisson's ratio δ, a long side dimension l, and a thickness t of the top panel 120, and the number of cycles k of the standing waves existing in a long side direction. Since the standing wave has the same waveform in units of ½ cycle, the number of cycles k takes values in increments of 0.5, which is 0.5, 1, 1.5, 2, and so on.

[Mathematical Formula 1]

$$f = \frac{\pi k^2 t}{l^2} \sqrt{\frac{E}{3\rho(1-\delta^2)}} \quad (1)$$

[Mathematical Formula 2]

$$f = \alpha k^2 \quad (2)$$

Note that a coefficient α in the formula (2) is a collective expression of coefficients other than $k^2$ in the formula (1).

The standing wave illustrated in FIGS. 4(A) and 4(B) is an exemplar waveform in a case where the number of cycles k is 10. In a case where Gorilla (registered trademark) glass having a long side length L of 140 mm, a short side length of 80 mm, and a thickness t of 0.7 mm is used as the top panel 120, for example, the natural frequency f is 33.5 [kHz] when the number of cycles k is 10. In that case, it is sufficient if a drive signal having a frequency of 33.5 [kHz] is used.

The top panel 120 is a tabular member, and when the vibrating element 140 (see FIGS. 2 and 3) is driven to generate the natural vibration in the ultrasonic band, it is bended as illustrated in FIGS. 4(A) and 4(B), thereby generating standing waves of bending vibration.

Note that, although the description herein is given of a mode in which one vibrating element 140 is bonded to the surface of the top panel 120 on the Z-axis negative direction side along the short side extending in the X-axis direction on the Y-axis positive direction side, two vibrating elements 140 may be used. In a case of using the two vibrating elements 140, it is sufficient if another one of the vibrating elements 140 is bonded to the surface of the top panel 120 on the Z-axis negative direction side along a short side extending in the X-axis direction on a Y-axis negative direction side. In this case, it is sufficient if the two vibrating elements 140 are disposed to be axially symmetric with a center line parallel to the two short sides of the top panel 120 serving as a symmetry axis.

Furthermore, in a case of driving the two vibrating elements 140, it is sufficient if the two vibrating elements 140 are driven in the same phase if the number of cycles k is an integer, and the two vibrating elements 140 are driven in opposite phases if the number of cycles k is a decimal (a number including an integer part and a decimal part).

Next, the natural vibration in the ultrasonic band generated in the top panel 120 of the electronic device 50 will be described with reference to FIGS. 5A and 5B.

Figure 5A:
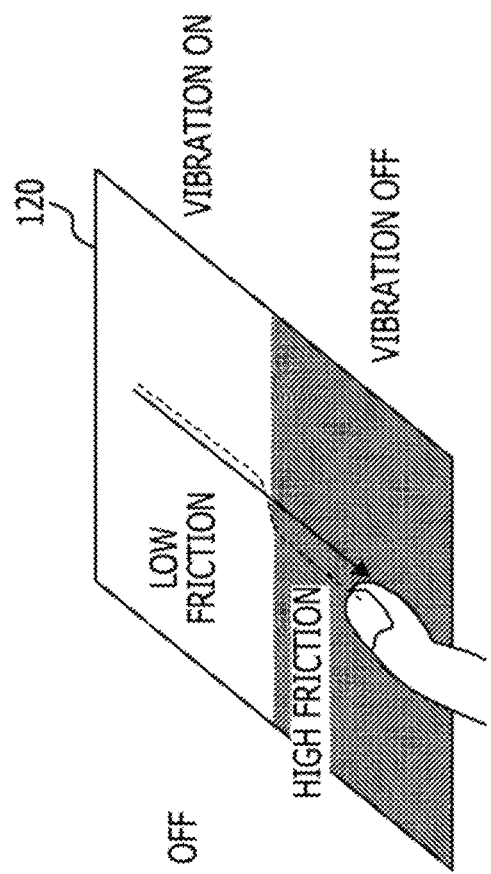
FIGS. 5A and 5B are a diagram for describing a state in which dynamic friction force applied to a fingertip performing operational input changes due to the natural vibration in the ultrasonic band generated in the top panel.
Figure 5B:
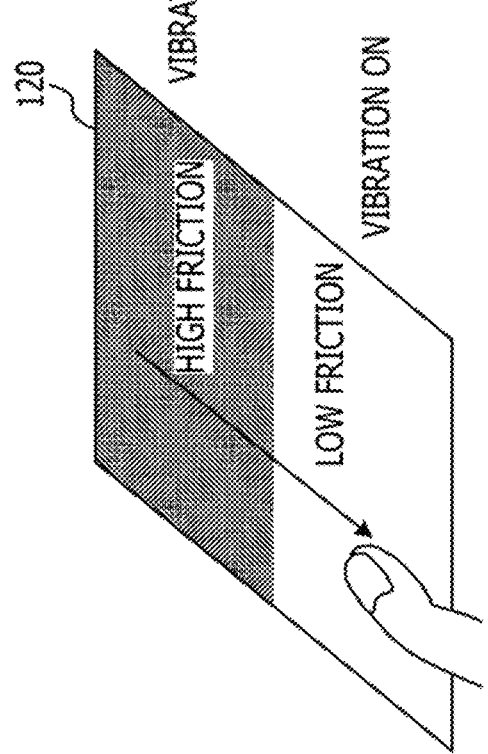

FIGS. 5A and 5B are a diagram illustrating a state in which a dynamic friction force applied to a fingertip performing operational input changes due to the natural vibration in the ultrasonic band generated in the top panel 120 of the electronic device 50. In FIGS. 5(A) and 5(B), the user is performing, while touching the top panel 120 with his/her fingertip, operational input of moving the finger along an arrow from the back side to the front side of the top panel 120. Note that the vibration is turned on/off by the vibrating element 140 (see FIGS. 2 and 3) being turned on/off.

Furthermore, in FIGS. 5(A) and 5(B), a range touched by the finger while the vibration is off is illustrated in gray, and a range touched by the finger while the vibration is on is illustrated in white in a depth direction of the top panel 120.

While the natural vibration in the ultrasonic band is generated in the entire top panel 120 as illustrated in FIGS. 4A and 4B, FIGS. 5(A) and 5(B) illustrate operation patterns of switching on/off of the vibration while the user's finger moves from the back side to the front side of the top panel 120.

Accordingly, in FIGS. 5A and 5B, the range touched by the finger while the vibration is off is illustrated in gray, and the range touched by the finger while the vibration is on is illustrated in white in the depth direction of the top panel 120.

In the operation pattern illustrated in FIG. 5A, the vibration is off when the user's finger is on the back side of the top panel 120, and the vibration is turned on while the finger moves to the front side.

On the other hand, in the operation pattern illustrated in FIG. 5B, the vibration is on when the user's finger is on the back side of the top panel 120, and the vibration is turned off while the finger moves to the front side.

Here, when the natural vibration in the ultrasonic band is generated in the top panel 120, an air layer based on the squeeze effect is interposed between the surface of the top panel 120 and the finger, and a dynamic friction coefficient at the time when the surface of the top panel 120 is traced with the finger decreases.

Accordingly, in FIG. 5A, the dynamic friction force applied to the fingertip is large in the range illustrated in gray on the back side of the top panel 120, and the dynamic friction force applied to the fingertip is small in the range illustrated in white on the front side of the top panel 120.

Accordingly, as illustrated in FIG. 5A, the user who performs operational input to the top panel 120 senses a decrease in dynamic friction force applied to the fingertip when the vibration is turned on, and perceives the ease of slipping of the fingertip. At this time, with the surface of the top panel 120 being smoother, the user feels that a recess exists on the surface of the top panel 120 when the dynamic friction force decreases.

On the other hand, in FIG. 5B, the dynamic friction force applied to the fingertip is small in the range illustrated in white on the back front side of the top panel 120, and the dynamic friction force applied to the fingertip is large in the range illustrated in gray on the front side of the top panel 120.

Accordingly, as illustrated in FIG. 5B, the user who performs operational input to the top panel 120 senses an increase in dynamic friction force applied to the fingertip when the vibration is turned off, and perceives a hard-to-slip sense of the fingertip or the feeling of being caught. Then, since the fingertip becomes less slippery, it feels as if a projection exists on the surface of the top panel 120 when the dynamic friction force increases.

As described above, the user can feel the unevenness with the fingertip in the case of FIGS. 5(A) and 5(B). The fact that a person perceives the unevenness in this manner is disclosed in, for example, "Print Transfer Method for Tactile Design and Sticky-band Illusion" (Papers of 11th Annual Conference of the Society of Instrument and Control Engineers (SICE) System Integration Division (SI2010, Sendai), 174-177, December 2010). Furthermore, it is also disclosed in "Fishbone Tactile Illusion" (Papers of 10th Annual Conference of the Virtual Reality Society of Japan (VRSJ) (September 2005)).

Note that, although the change in dynamic friction force in the case where on/off of the vibration is switched has been described here, the same applies to a case where the amplitude (intensity) of the vibrating element 140 is changed.

FIG. 6 is a diagram illustrating antinodes of a standing wave generated in the top panel 120 and ultrasonic waves radiated from the top panel 120. A waveform of the standing wave illustrated in FIG. 6 is a waveform at a certain timing of the standing wave whose amplitude fluctuates with time. Note that, in FIG. 6, XYZ coordinates similar to those in FIGS. 2 to 4 are defined, and displacement of the standing wave is also illustrated.

As illustrated in FIG. 6, on the top panel 120, a convex antinode illustrated in dark gray and a concave antinode illustrated in light gray alternately occur. The convex antinodes illustrated in dark gray and the concave antinodes illustrated in light gray are those at maximum amplitude. Since the antinode is a part where the amplitude of the standing wave is the largest, intensity of the ultrasonic waves radiated into the air from the top panel 120 is the largest. As illustrated in FIG. 6, the ultrasonic waves are radiated into the air from the top panel 120.

Next, the ultrasonic waves radiated from the top panel 120 will be described with reference to FIG. 7.

Figure 7:
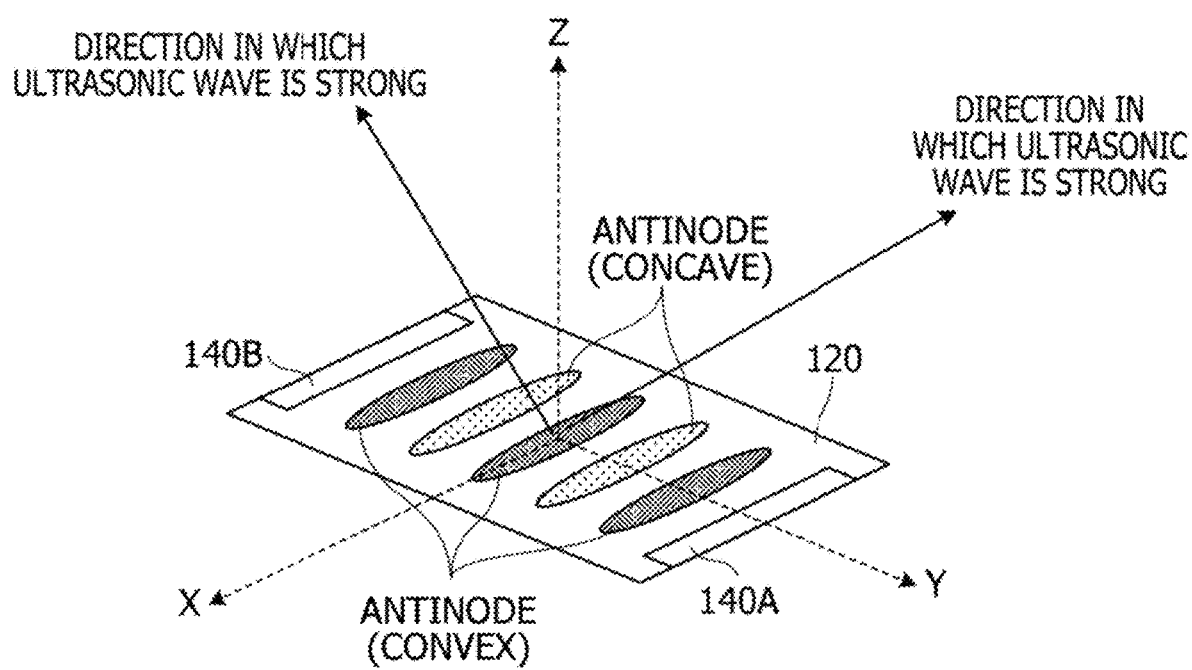
FIG. 7 is a diagram illustrating the ultrasonic waves radiated from the top panel.

FIG. 7 is a diagram illustrating the ultrasonic waves radiated from the top panel 120. In FIG. 7, XYZ coordinates similar to those in FIGS. 2 to 4 are defined.

The top panel 120 is provided with vibrating elements 140A and 140B. The vibrating element 140A is similar to the vibrating element 140 illustrated in FIGS. 2 and 3, and the vibrating element 140B is disposed along the X-axis at an end of the top panel 120 on the Y-axis negative direction side. In other words, the vibrating element 1408 is disposed along an opposite side of the side of the top panel 120 at which the vibrating element 140A is disposed.

Here, it is assumed that the vibrating elements 140A and 1408 are driven in the same phase, and convex antinodes illustrated in dark gray and concave antinodes illustrated in light gray are generated on the top panel 120 at a certain timing. The convex antinodes illustrated in dark gray and the concave antinodes illustrated in light gray are those at maximum amplitude, similarly to FIG. 6.

Ultrasonic waves are radiated when portions of the antinodes of the standing wave vibrate the air. Furthermore, it has been found by an experiment that the ultrasonic waves are strongly radiated in a direction of having an angle (oblique) with respect to the Y-axis and the Z-axis in a YZ plane.

Note that, at a timing different from the timing illustrated in FIG. 7 by a half cycle of the natural vibration of the standing wave, concave antinodes at the maximum amplitude are generated at portions of the convex antinodes illustrated in dark gray in FIG. 7, and convex antinodes at the maximum amplitude are generated at portions of the concave antinodes illustrated in light gray in FIG. 7.

Figure 8:
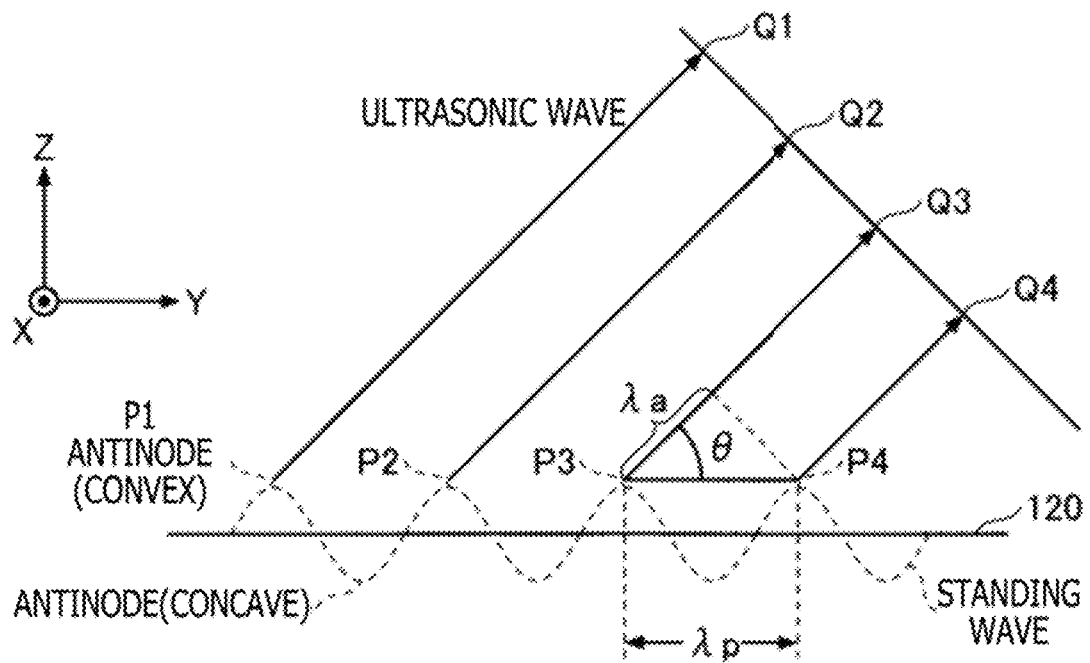
FIG. 8 is a diagram illustrating the standing wave of the top panel and the ultrasonic waves radiated from a surface of the top panel illustrated in FIG. 7 in a sectional view parallel to a YZ plane.

FIG. 8 is a diagram illustrating the standing wave of the top panel 120 and the ultrasonic waves radiated from the surface of the top panel 120 illustrated in FIG. 7 in a sectional view parallel to the YZ plane. Note that, in FIG. 8, the vibrating elements 140A and 140B are omitted.

The surface of the top panel 120 is flat as illustrated by a solid line in a state in which the vibrating elements 140A and 140B are not driven. When the vibrating elements 140A and 1400 are driven by a drive signal that generates natural vibration in an ultrasonic band in the top panel 120, a standing wave is generated as illustrated by a broken line. FIG. 8 illustrates four convex antinodes and four concave antinodes.

Here, assuming that a wavelength of the standing wave generated in the top panel 120 is $\lambda p$ and a wavelength of the ultrasonic wave in the air at the frequency of the drive signal in the ultrasonic band is $\lambda a$, an angle $\theta$ (elevation angle) formed by a direction in which the ultrasonic wave is strongly radiated with respect to the surface of the top panel 120 in a non-vibrating state satisfies a condition of the following formula (3).

$$\cos \theta = \lambda a / \lambda p \quad (3)$$

The reason why the strong ultrasonic wave is radiated in a specific direction in which such a formula (3) is established is as follows. It is because, as illustrated in FIG. 8, vibration of the standing wave in the top panel 120 is spatially periodic, and the standing wave has the maximum amplitude at the portions of the antinodes, so that ultrasonic vibrations generated in the air by the vibration of the standing wave are considered to overlap each other in the specific direction.

Therefore, it is considered that the ultrasonic waves generated in the air by the standing wave intensify each other in the direction of the angle θ satisfying the formula (3) with respect to the positions of the antinodes of the standing wave. Specifically in FIG. 8, considering points Q1, Q2, Q3, and Q4 on a straight line perpendicular to the direction of the angle θ, ultrasonic waves radiated in the direction of the angle θ from points P1, P2, P3, and P4 where the convex antinodes are located intensify each other at the points Q1, Q2, Q3, and Q4, respectively. Note that ultrasonic waves in the air observed in results of an actual experiment had a directivity that almost coincided with the direction of the angle θ satisfying the formula (3).

Figure 9:
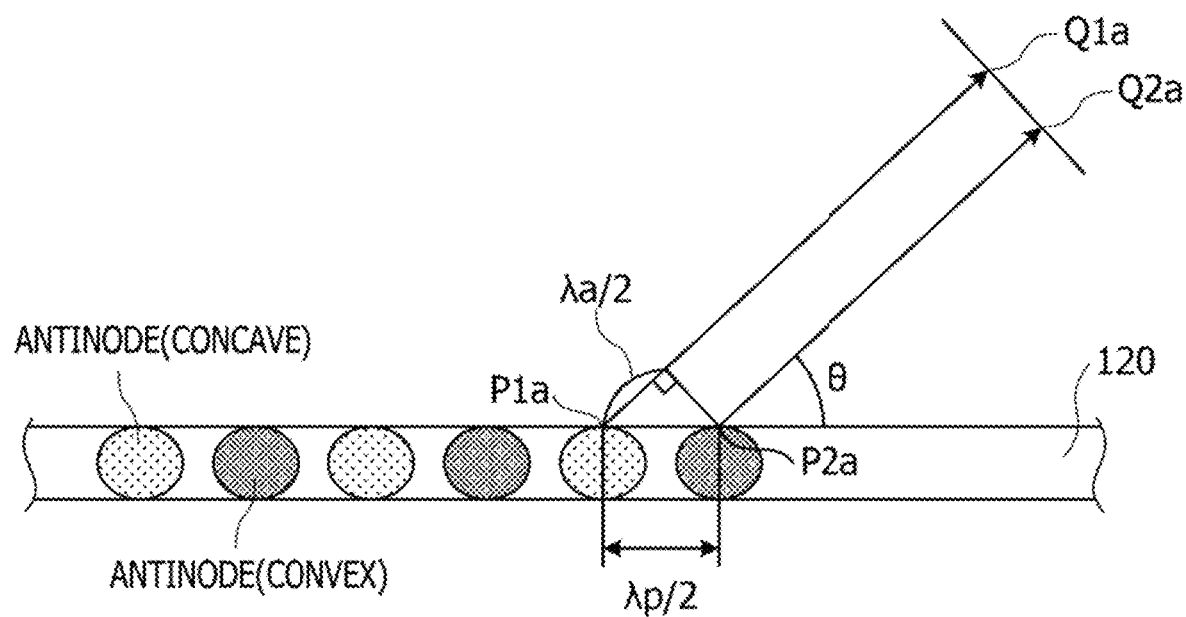
FIG. 9 is a diagram illustrating the standing wave of the top panel and the ultrasonic waves radiated from the surface of the top panel illustrated in FIG. 7 in a sectional view parallel to the YZ plane.

FIG. 9 is a diagram illustrating the standing wave of the top panel 120 and the ultrasonic waves radiated from the surface of the top panel 120 illustrated in FIG. 7 in a sectional view parallel to the YZ plane. Note that, in FIG. 9, similarly to FIG. 6, a position where a convex antinode is generated on the top panel 120 at a certain timing is illustrated in dark gray, and a position where a concave antinode is generated on the top panel 120 at the certain timing is illustrated in light gray.

As illustrated in FIG. 9, the two adjacent antinodes are in opposite phases. In the direction of the angle satisfying the formula (3), ultrasonic waves generated in the air from points P1a and P2a where the two adjacent antinodes of the standing wave are located intensify each other at points Q1a and Q2a. Note that the points Q1a and Q2a are points on a straight line perpendicular to the direction of the angle θ.

Figure 10:
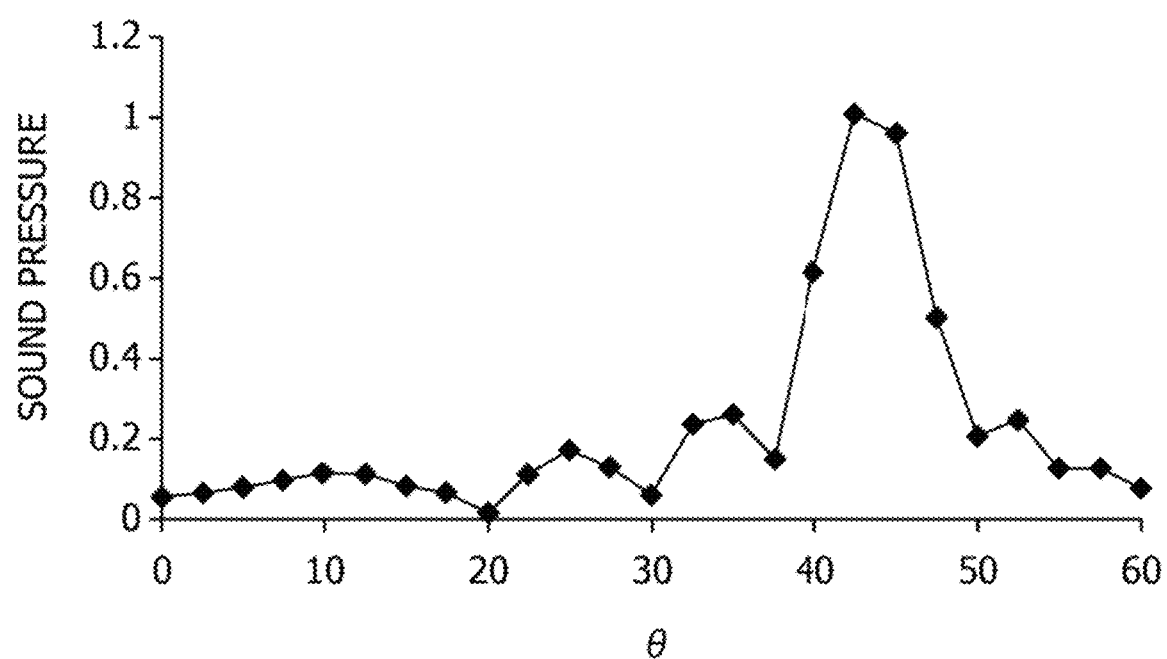
FIG. 10 is a graph illustrating a measurement result of sound pressure characteristics with respect to an angle θ.

When a distribution of directions in which ultrasonic vibrations are radiated from the surface of the top panel 120 was measured, an angular distribution as illustrated in FIG. 10 was obtained.

FIG. 10 is a graph illustrating a measurement result of sound pressure characteristics with respect to the angle θ. A unit of the angle θ represented on a horizontal axis is a degree, and sound pressure (amplitude of the standing wave) on a vertical axis is represented in an arbitrary unit (a.u.).

The measurement was performed while changing the angle θ under a condition that a ratio (λa/λp) of the wavelength λa of the ultrasonic wave in the air to the wavelength λp of the standing wave is about 0.7 (panel material and thickness, drive frequency). It was found that a maximum peak of the sound pressure tends to exist when the angle θ is around 45 degrees. This angle θ is the direction in which the ultrasonic waves satisfying the formula (3) intensify each other. In a range where the sound pressure is large, the angle θ is about 45±5 degrees.

Figure 11:
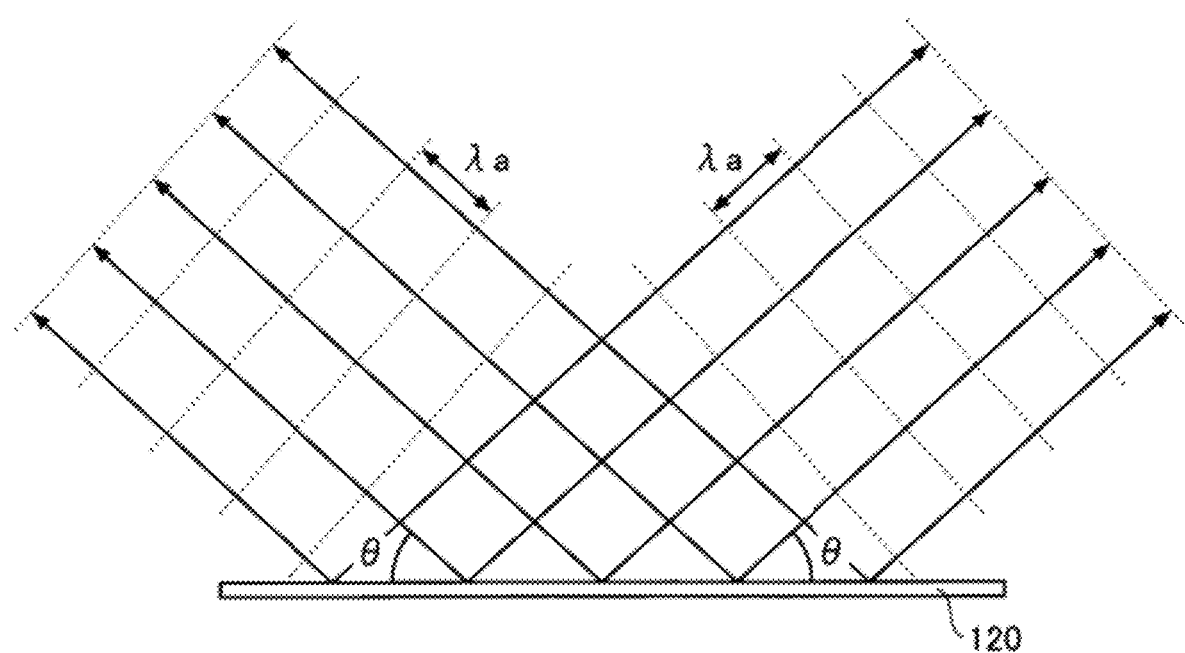
FIG. 11 is a diagram illustrating the standing wave of the top panel and the ultrasonic waves radiated from the surface in a sectional view parallel to the YZ plane.

Note that, as illustrated in FIG. 11, directions of the angles θ are on both sides in a YZ plan view of the top panel 120. FIG. 11 is a diagram illustrating the standing wave of the top panel 120 and the ultrasonic waves radiated from the surface in a sectional view parallel to the YZ plane. As illustrated in FIG. 11, propagating sound waves having planar wave surfaces are generated in a direction of the angle θ counterclockwise with respect to the Y-axis positive direction and in a direction of the angle θ clockwise with respect to the Y-axis negative direction.

As described above, in the electronic device 50 of the prerequisite technology, the strong ultrasonic waves are radiated into the air from the top panel 120 in the direction of the angle 9 counterclockwise with respect to the Y-axis positive direction of the top panel 120 and in the direction of the angle θ clockwise with respect to the Y-axis negative direction thereof.

Figure 12:
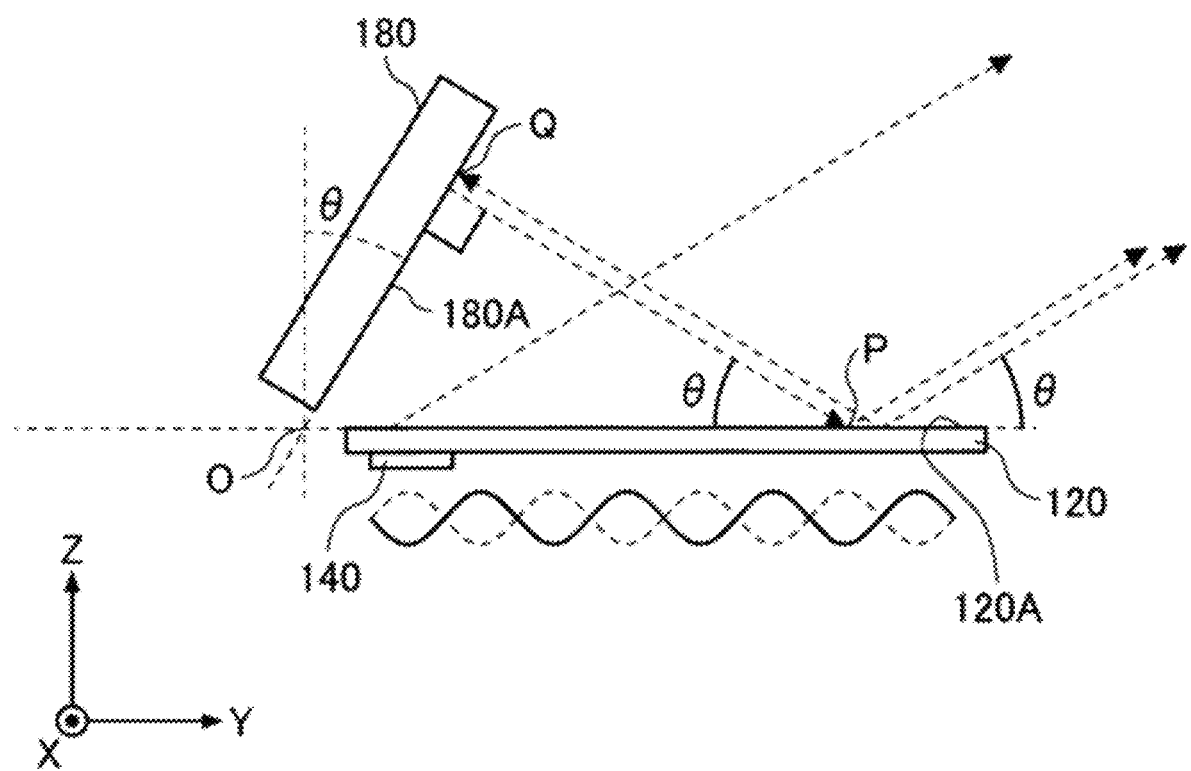
FIG. 12 is a diagram illustrating a configuration of an electronic device according to an embodiment.

In the following, an electronic device 100 that suppresses radiation of ultrasonic waves will be described. FIG. 12 is a diagram illustrating a configuration of the electronic device 100 according to the embodiment. In describing the configuration of the electronic device 100 below, FIGS. 1 to 3 are referred to. The electronic device 100 has a configuration in which a reflector 180 is added to the electronic device 50 of the prerequisite technology. The reflector 180 is an example of a reflecting unit.

Accordingly, the electronic device 100 includes a housing 110, a top panel 120, a double-sided tape 130, a vibrating element 140, a touch panel 150, a display panel 160, a substrate 170, and the reflector 180. In FIG. 12, the electronic device 100 is simplified to illustrate only the top panel 120, the vibrating element 140, and the reflector 180, and the other components are omitted.

Note that, in FIG. 12, the vibrating element 140 extends in an X-axis direction at an end on a Y-axis negative direction side. The vibrating element 140 is a striped element elongated in the X-axis direction in a plan view.

The reflector 180 is a tabular resin member, and is disposed near the end of the top panel 120 on the Y-axis negative direction side as an example. In the following, a configuration in which a YZ plane is viewed from an X-axis positive direction side will be described. The reflector 180 is disposed so that a reflective surface 180A, which is one surface of the tabular reflector 180, is rotated clockwise by θ degrees with respect to an XZ plane in a YZ plan view from a state in which the reflective surface 180A is disposed parallel to the XZ plane.

The angle θ is determined by the formula (3) from a wavelength λp of a standing wave generated in the panel and a wavelength λa of an ultrasonic wave at a drive frequency, and is a direction in which the ultrasonic waves radiated into the air intensify each other. The wavelength λp of the standing wave is determined by a mode of the standing wave generated in the panel, and the wavelength λa of the ultrasonic wave is determined by propagation speed and a drive frequency of a sound wave. Note that it is sufficient if the reflector 180 is attached to the housing 110 (see FIGS. 2 and 3), which is not illustrated in FIG. 12, for example, and is disposed perpendicular to a plane wave radiated at the angle θ illustrated in FIG. 11.

Here, a point where a line of intersection between a plane extending the reflective surface 180A of the reflector 180 and a surface 120A of the top panel 120 is viewed in the YZ plane is defined as an intersection O. A point P on the surface 120A of the top panel 120 is a center point of an antinode of the standing wave generated in the top panel 120 in a Y-axis direction, and more specifically, a point in which amplitude becomes maximum in the antinode in the Y-axis direction.

An ultrasonic wave radiated from the point P and propagated in an upper left direction in FIG. 12 at the angle θ with respect to the surface 120A is vertically incident on a point Q on the reflective surface 180A of the reflector 180 and reflected, and reaches the point P on the surface 120A of the top panel 120 following the same path as that at the time of the incident. Then, the ultrasonic wave is reflected at the point P and propagates from the point P in an upper right direction at the angle θ with respect to the surface 120A.

Note that, in FIG. 12, in order to make it easier to see the path of the ultrasonic wave radiated from the point P, sequentially reflected at the points Q and P, and propagated in the upper right direction, the paths before and after the reflection are shifted.

Here, in order to weaken the ultrasonic wave from the point P reflected by the reflector 180 and returned to the point P and the ultrasonic wave radiated from the point P in the upper right direction at the angle θ each other, it is sufficient if a phase difference between the ultrasonic waves is a half cycle, that is, a difference between the propagation paths is $\lambda a/2$. In other words, it is sufficient if twice the length of PQ in FIG. 12 satisfies the following formula (4). Note that N is an arbitrary positive integer.

$$PQ \times 2 = \lambda a/2 + N \times \lambda a \quad (4)$$

In other words, $PQ=(\lambda a/2) \times (N+\frac{1}{2})$. Note that, in order to derive the formula (4), a phase of ultrasonic pressure change is taken into consideration. Specifically, it is taken into consideration that the ultrasonic wave radiated in the upper right direction due to the vibration of the top panel 120 and the ultrasonic wave radiated in the upper left direction have the same phase of pressure change, and the phase of the pressure change is not changed (not reversed) by reflection.

Figure 13:
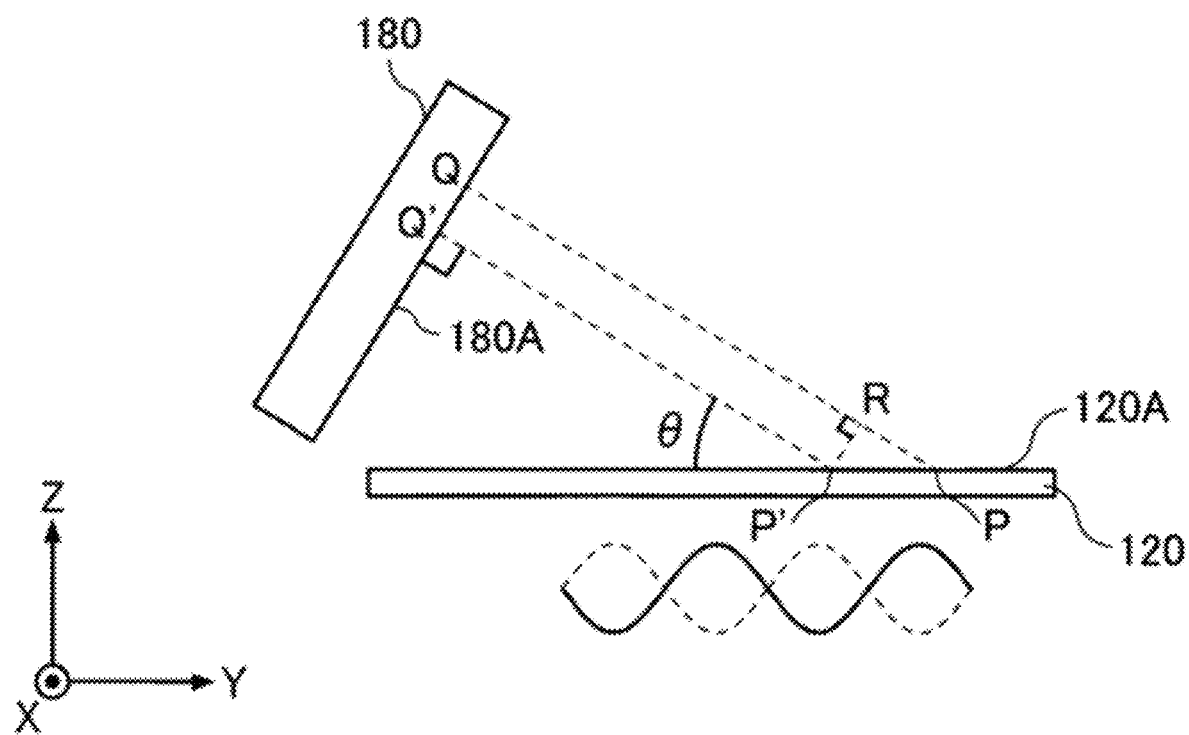
FIG. 13 is a diagram illustrating propagation paths of ultrasonic waves radiated from adjacent antinodes of a standing wave generated in a top panel.

Next, with reference to FIG. 13, a point P' in which a center point of an antinode next to the antinode of the point P is located is considered. FIG. 13 is a diagram illustrating propagation paths of ultrasonic waves radiated from the adjacent antinodes of the standing wave generated in the top panel 120.

PP' is $\lambda p/2$. PR=PQ−P'Q' and the following formula (5) holds from the condition of the formula (3). Note that PR is $\lambda a/2$.

$$PR = \lambda p/2 \times \cos\theta = \lambda a/2 \quad (5)$$

Therefore, twice the length of P'Q' can be obtained by the following formula (6).

$$P\,\'\,Q\,\'\, \times 2 = PQ \times 2 - PR \times 2$$
$$= \lambda a/2 + N \times \lambda a - \lambda a$$
$$= \lambda a/2 + (N-1)\lambda a \quad (6)$$

In other words, the formula (6) is synonymous with the formula (4). Therefore, the formula (4) holds for any antinode if the point P holds for one antinode.

In the above discussion, only the path of ultrasonic wave from the central point of the antinode is considered. In reality, an ultrasonic wave is also generated from a position deviated from the center of the antinode, and if the formula (4) holds at the center point P of the antinode, the formula (4) does not hold at the position deviated from the center. However, considering that the components generated at all the positions of the panel are integrated into the plane wave as illustrated in FIG. 11, it is considered possible to superimpose and cancel the plane waves. The above discussion is based on the idea that a condition for canceling the plane waves can be estimated by the path from the center point P of the antinode, and experiments have confirmed that the method of thinking at the center point of the antinode is appropriate.

Further, the position of the reflector 180 for which the formula (4) holds is expressed by using the intersection O as follows. First, the following formula (7) holds.

$$OP = PQ/\cos\theta \quad (7)$$

Using the condition of the formula (4) in the formula (7), the following formula (8) is obtained.

$$OP = (\lambda a/4 + N \times \lambda a/2) \times \lambda p/\lambda a \quad (8)$$

Further transformation gives the following formula (9).

$$OP = N \times \lambda p/2 + \lambda p/4 \quad (9)$$

In other words, if the length of OP satisfies the formula (9), the ultrasonic wave radiated from the antinode at the point P is weakened.

By the way, since an interval between adjacent antinodes generated on the top panel 120 is $\lambda p/2$, a point on the surface 120A of the top panel 120 having a distance of an integral multiple of $\lambda p/2$ from the point P is the center point of the antinode.

Therefore, the formula (9) indicates that the point O is a center point of a node of the standing wave generated in the top panel 120. The intersection O may be located outside the top panel 120 in the Y-axis direction as illustrated in FIG. 12, or may be located between both ends of the top panel 120 in the Y-axis direction. In the former case, the intersection O is virtually located at the center point of the node of the standing wave extending to the outside of the top panel 120. In the latter case, the formula (9) indicates that the point O is the center point of the node of the standing wave generated in the top panel 120.

In other words, the intersection O is located at the center point of the node of the standing wave generated in the top panel 120, or at a point outside the top panel 120 that is separated by $\lambda p/2 \times M$ (M is an arbitrary positive integer) in the Y-axis direction in which amplitude of the standing wave fluctuates from the node of the standing wave generated in the top panel 120.

Therefore, if the intersection O is placed at the above-mentioned position and the reflector 180 is placed so that an angle between the reflective surface 180A and an operation surface is (90−θ) degrees, radiation of ultrasonic waves from the top panel 120 into the air can be suppressed.

A vibration mode shape of the standing wave generated in the top panel 120 can be obtained from a beam vibration theory. Assuming that a Y coordinate of the end on the Y-axis negative direction side is zero, a length of the top panel 120 in the Y-axis direction is L, a Y coordinate of an end on a Y-axis positive direction side is L, and displacement of the standing wave perpendicular to the surface 120A at a position Y in the Y-axis direction is U(y), a differential equation of the following formula (10) holds for beam motion.

$$d^4U/dy^4 - a^4U = 0 \quad (10)$$

A solution of the differential equation can be expressed by a general expression expressed by the following formula (11).

$$U(y) = C1 \times \cos(ay) + C2 \times \cos h(ay) + C3 \times \sin(ay) + C4 \times \sin h(ay) \quad (11)$$

By defining boundary conditions at Y=0 and Y=L, a value of a that satisfies the boundary conditions and integration constants C1 to C4 can be obtained. For example, in a case where the end on the Y-axis negative direction side (Y=0) and the end on the Y-axis positive direction side (Y=L) of the top panel 120 are not fixed, that is, free ends, and the ends along two sides parallel to the Y-axis are fixed to the housing 110 with the double-sided tape 130, the vibration mode shape of the standing wave in the Y-axis direction can be obtained if the value of a that satisfies the boundary conditions and the integration constants C1 to C4 are obtained using the formula (11) as boundary conditions of the free ends.

Note that a distribution of vibrations in the X-axis direction is Ideally uniform, but in reality, by fixing the ends, it is a distribution in which vibration is strong at the center and gradually weakens toward the ends. Ultrasonic waves are similarly radiated from the top panel 120, whether it is a uniform distribution or a distribution with weakened ends.

When a solution of the formula (11) is obtained under the boundary condition of the free ends, the vibration mode shape is determined by the number of nodes. For example, FIG. 14 illustrates a solution when there are 10 nodes.

Figure 14:
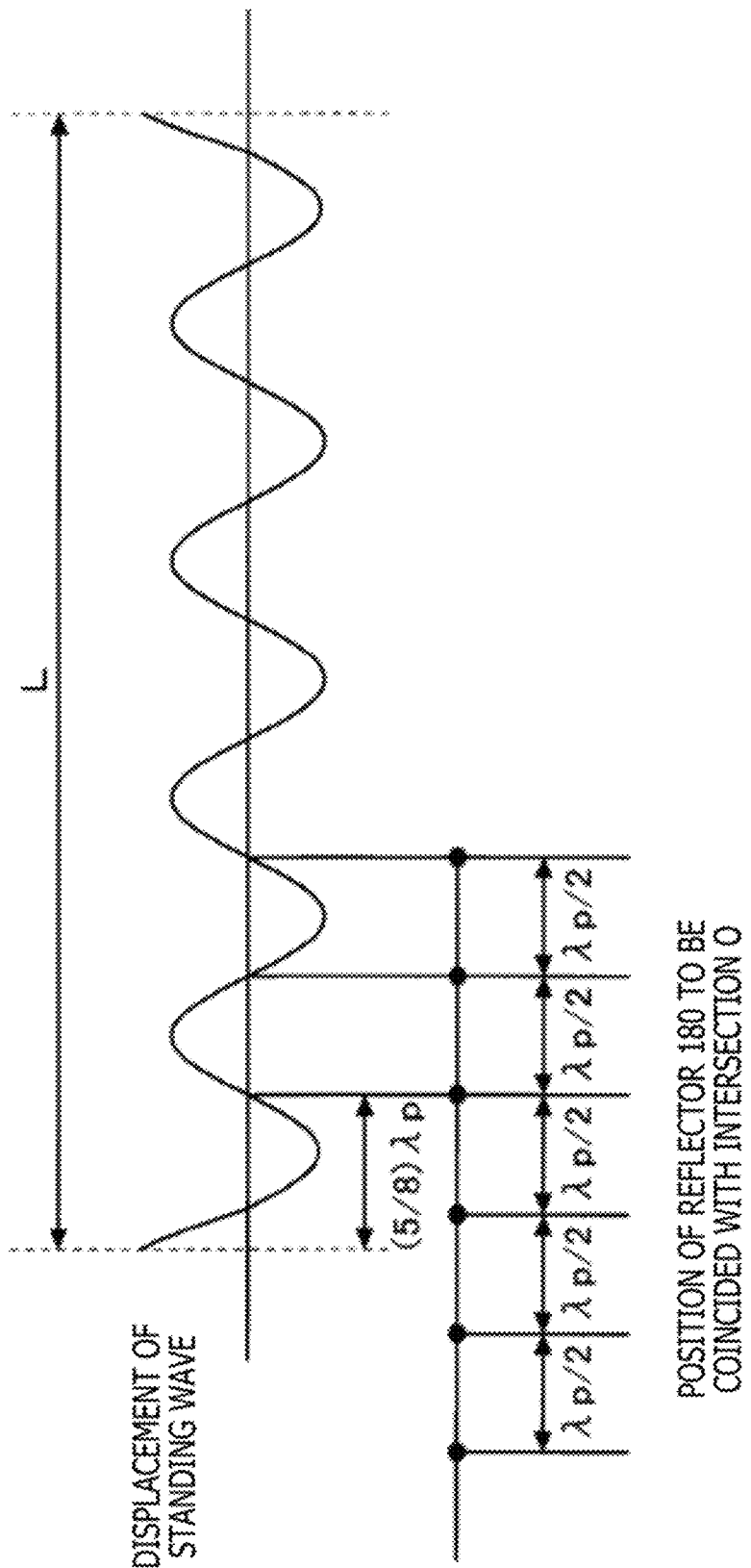
FIG. 14 is a diagram illustrating a vibration mode shape in a Y-axis direction of the top panel.

FIG. 14 is a diagram illustrating a vibration mode shape of the top panel 120 in the Y-axis direction. Except for parts near both ends, the shape is almost trigonometric. An interval between nodes is $\lambda p/2$. It is known from calculation that a total length L of the top panel 120 in the Y-axis direction is approximately an integral multiple of $\lambda p/2$ plus $\lambda p/4$, and a distance from the end of the top panel 120 to the nearest node is about $\lambda p/8$.

A position of the node closest to the end is slightly irregular. A distance from the first to the second node is slightly smaller than $\lambda p/2$, and a distance from the end to the first node is slightly larger than $\lambda p/8$. However, a distance from the end to the second node of the top panel 120 is $5\lambda p/8$, which is almost constant even if the number of nodes changes.

From these, if it is a mode in which the total length L of the top panel 120 is L and the number of nodes is 10, $L=4.75\lambda p$, so that $\lambda p=L/4.75$ can be obtained. Furthermore, in order to obtain the intersection O, a position of a node of a main part of the top panel 120 should be reflected. Accordingly, it should be a position extending from the second or third node at intervals of $\lambda p/2$ using the second or third node as illustrated on a lower side of FIG. 14 as a reference, rather than using the position of the first node from the end of the top panel 120 that is slightly misaligned as described above as the reference.

Since the distance from the second node to the end of the top panel 120 is $5\lambda p/8$ as described above, the distance from a target position to the end of the top panel 120 is a value obtained by subtracting $\lambda p/8$ from an integral multiple of $\lambda p/2$.

Note that the vibration mode shape can be calculated from the formula (11) even when both the ends of the top panel 120 in the Y-axis direction are fixed ends. Due to influence of rigidity and the like of a member to be fixed such as the double-sided tape 130, there is a possibility that an ideal fixed end is not obtained, and a position of the node can be deviated from a calculation result. Therefore, it may be effective to confirm the position of the node by actually measuring the vibration mode shape, and determine a position of the reflector 180 by reflecting a measurement result. Further, even if both the ends of the top panel 120 in the Y-axis direction are free ends, the position of the reflector 180 may be determined from the measurement result of the vibration mode shape.

Figure 15:
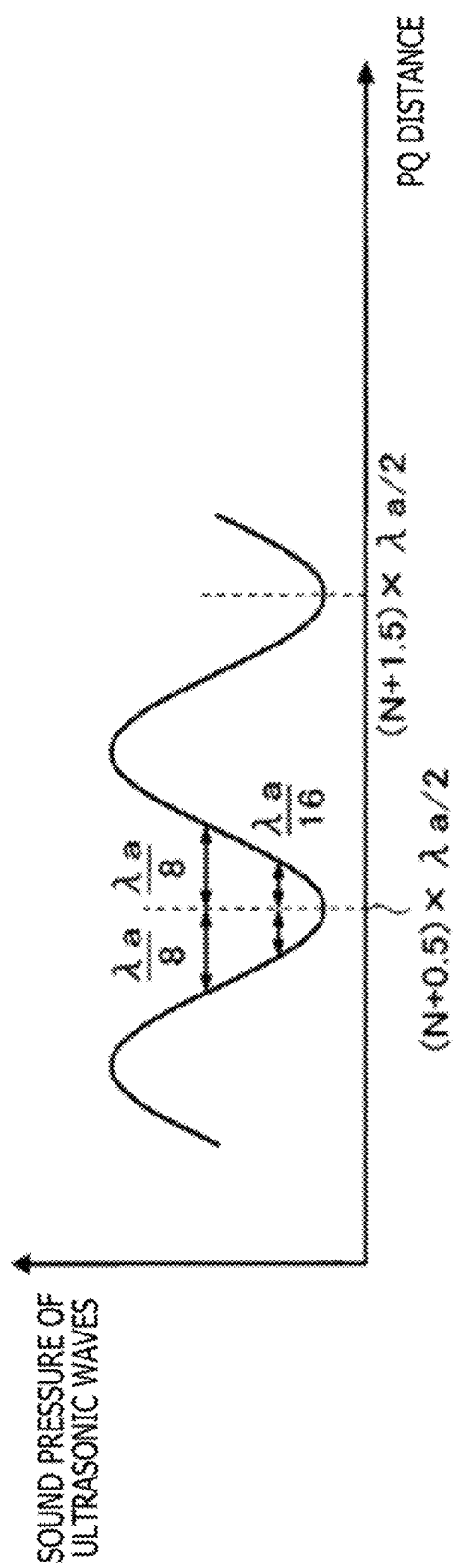
FIG. 15 is a graph illustrating a change in sound pressure of ultrasonic waves with respect to a position of a reflector.

FIG. 15 is a graph illustrating a change in sound pressure of ultrasonic waves with respect to the position of the reflector 180. A horizontal axis represents a distance PQ, and a vertical axis represents sound pressure of ultrasonic waves radiated in a direction without the reflector 180 (the upper right direction in FIG. 12). The sound pressure of the ultrasonic waves is radiation intensity of the ultrasonic waves. Furthermore, the distance PQ is a distance between P and Q.

The radiation intensity is minimized at a position where the distance PQ satisfies the formula (4), and is maximized at a position $\lambda a/4$ deviated from the position where the radiation is minimized. In a case where the reflector 180 is not placed, the intensity will be between minimum and maximum values.

Therefore, in order to reduce the radiation intensity (sound pressure) by arranging the reflector 180 as compared with a case where the reflector 180 is not arranged, it is preferable to keep an error of the distance PQ when the reflector 180 is arranged within the range of $\pm\lambda a/8$ from an optimum installation position of the reflector 180. As illustrated in FIG. 12, the distance PQ is a distance from the point P at the center of the antinode of the top panel 120 to the point Q where a straight line extending in the direction of the angle $\theta$ intersects the reflective surface 180A of the reflector 180 perpendicularly.

Furthermore, since the change in sound pressure with respect to the distance PQ has a distribution according to a trigonometric function as illustrated in FIG. 15, an effect of weakening the ultrasonic waves does not sharply decrease even if the reflector 180 slightly deviates from an optimum position. However, if the error of the distance PQ exceeds $\lambda a/16$, the sound pressure changes rapidly. Therefore, it is more preferable that the error of the distance PQ is within the range of $\pm\lambda a/16$. Note that and the wavelength of the ultrasonic waves is about 10 mm at the frequency of 30 kHz, and it is not particularly difficult to attach the reflector 180 with this accuracy.

Since the distance PQ is represented by $(\lambda a/2)\times(N+\frac{1}{2})$, it only needs to be about $(\lambda a/2)\times(N+\frac{1}{2})$ in consideration of the above-mentioned error such as a manufacturing error. Since the error of the distance PQ is preferably in the range of $\pm\lambda a/8$, about $(\lambda a/2)\times(N+\frac{1}{2})$ means that the distance PQ only needs to be within the range from $(\lambda a/2)\times(N+\frac{1}{2})-\lambda a/8$ to $(\lambda a/2)\times(N+\frac{1}{2})+\lambda a/8$.

Furthermore, it is more preferable that the distance PQ be within the range from $(\lambda a/2)\times(N+\frac{1}{2})-\lambda a/16$ to $(\lambda a/2)\times(N+\frac{1}{2})+\lambda a/16$.

Furthermore, the measurement result of the sound pressure characteristics with respect to the angle $\theta$ illustrated in FIG. 10 is a result measured in the electronic device 50 of the prerequisite technology not including the reflector 180. The range where the sound pressure is strong is the range of 45 degrees±5 degrees.

In order to weaken the ultrasonic waves by the reflector 180, the direction of the ultrasonic wave reflected at the point P on the surface 120A of the top panel 120 and the direction of the ultrasonic wave radiated from the point P in the upper right direction at the angle $\theta$ are overlapped.

Therefore, if the angle error of the reflector 180 is set within ±2.5 degrees, which is half of ±5 degrees, it is considered that the effect of weakening the ultrasonic waves can be obtained.

Figure 16:
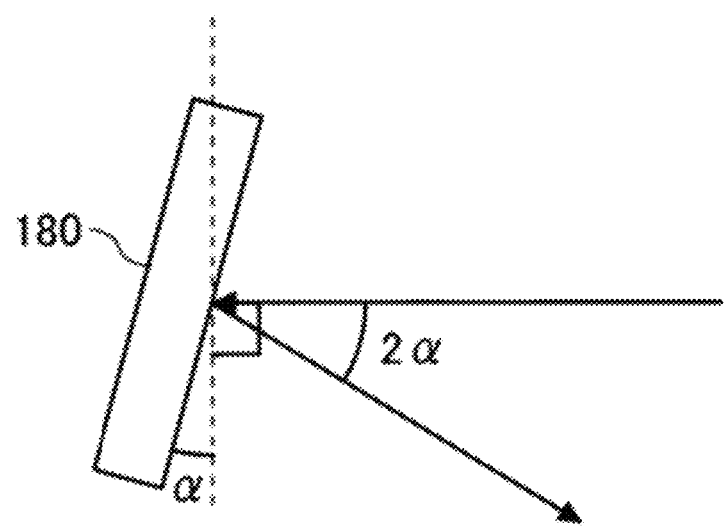
FIG. 16 is a diagram illustrating a state of a change in a direction of a reflected wave with respect to a change in an angle of the reflector.

However, considering that a direction of a reflected wave changes by 20 degrees when the angle of the reflector 180 changes by a degrees as illustrated in FIG. 16, if the angle error of the reflector 180 is within ±1.25 degrees, which is half of ±2.5 degrees, it is considered that a better effect can be obtained.

The angle formed by the reflective surface 180A of the reflector 180 and the surface 120A of the top panel 120 only needs to be about $(90-\theta)$ degrees in consideration of an error such as a manufacturing error. The range of about $(90-\theta)$ degrees is from (90−(θ+2.5)) degrees to (90−(θ−2.5)) degrees, more preferably from (90−(θ+1.25)) degrees to (90−(θ−1.25)) degrees.

Furthermore, it is sufficient if the intersection O substantially coincides with a point separated from the center point of the node in the Y-axis direction by λp/2×M (M is an arbitrary positive integer). A range of substantially coincidence only needs to be a range within the range of the error between the distance PQ and the range of the error of the angle θ as described above. In other words, the substantially coincidence means that position deviation is allowed within a range that does not expand the range of the error between the distance PQ and does not expand the range of the error of the angle θ as described above.

Next, a configuration of the electronic device 100 according to the embodiment will be described with reference to FIG. 17.

Figure 17:
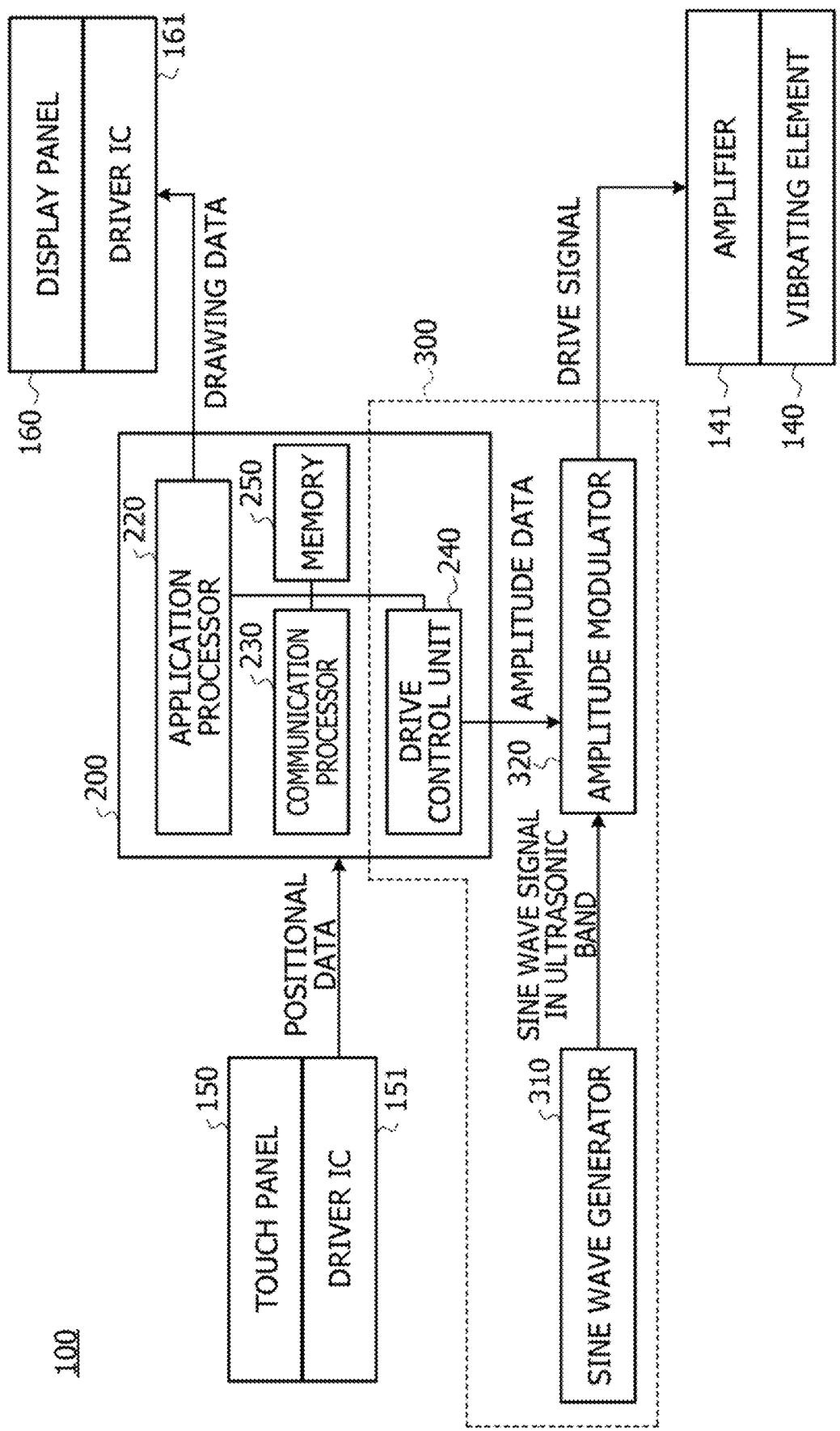
FIG. 17 is a diagram illustrating a configuration of the electronic device according to the embodiment.

FIG. 17 is a diagram illustrating the configuration of the electronic device 100 according to the embodiment.

In addition to the components described above, the electronic device 100 further includes an amplifier 141, a driver integrated circuit (IC) 151, a driver IC 161, a control unit 200, a sine wave generator 310, and an amplitude modulator 320.

The control unit 200 includes an application processor 220, a communication processor 230, a drive control unit 240, and a memory 250. The control unit 200 is implemented by, for example, an IC chip.

Furthermore, the drive control unit 240, the sine wave generator 310, and the amplitude modulator 320 constitute a drive control device 300. Note that, although a mode in which the application processor 220, the communication processor 230, the drive control unit 240, and the memory 250 are implemented by one control unit 200 will be described here, the drive control unit 240 may be separately provided outside the control unit 200 as another IC chip or a processor. In that case, it is sufficient if, among data stored in the memory 250, data necessary for drive control of the drive control unit 240 is stored in a memory different from the memory 250 and provided inside the drive control device 300.

In FIG. 17, the housing 110, the top panel 120, the double-sided tape 130, and the substrate 170 (see FIG. 2) are omitted. Additionally, description herein will be given of the amplifier 141, the driver IC 151, the driver IC 161, the drive control unit 240, the memory 250, the sine wave generator 310, and the amplitude modulator 320.

The amplifier 141 is disposed between the drive control device 300 and the vibrating element 140, and amplifies a drive signal output from the drive control device 300 to drive the vibrating element 140.

The driver IC 151 is connected to the touch panel 150, detects positional data indicating a position at which operational input to the touch panel 150 has been made, and outputs the positional data to the control unit 200. As a result, the positional data is input to the application processor 220 and the drive control unit 240. Note that inputting positional data to the drive control unit 240 is equivalent to inputting positional data to the drive control device 300.

The driver IC 161 is connected to the display panel 160, inputs drawing data output from the drive control device 300 to the display panel 160, and causes the display panel 160 to display an image based on the drawing data. Therefore, the GUI operation unit, an image based on the drawing data, or the like is displayed on the display panel 160.

The application processor 220 performs processing for executing various applications of the electronic device 100.

The communication processor 230 executes processing necessary for the electronic device 100 to perform communication, such as 3rd generation (3G), 4th generation (4G), long term evolution (LTE), and Wi-Fi.

In a case where two predetermined conditions are satisfied, the drive control unit 240 outputs amplitude data to the amplitude modulator 320. The amplitude data is data indicating an amplitude value for adjusting intensity of the drive signal used to drive the vibrating element 140. The amplitude value is set according to a degree of temporal change in the positional data. Here, as the degree of temporal change in the positional data, a speed at which the user's fingertip moves along the surface of the top panel 120 is used. A moving speed of the user's fingertip is calculated by the drive control unit 240 on the basis of the degree of temporal change in the positional data input from the driver IC 151.

Furthermore, the drive control device 300 according to the embodiment vibrates the top panel 120 to change dynamic friction force applied to the user's fingertip when the fingertip moves along the surface of the top panel 120. Since the dynamic friction force is generated during the movement of the fingertip, the drive control unit 240 vibrates the vibrating element 140 when the moving speed becomes equal to or higher than a predetermined threshold speed.

Accordingly, the amplitude value indicated by the amplitude data output from the drive control unit 240 is zero when the moving speed is lower than the predetermined threshold speed set in advance, and is set to a predetermined amplitude value when the moving speed becomes equal to or higher than the predetermined threshold speed. The amplitude value is determined by the amplitude data set according to a type of the application being executed, a position where operational input is performed, and the like.

Furthermore, in a case where a position of the fingertip that performs operational input is within a predetermined area where vibration is to be generated, the drive control device 300 according to the embodiment outputs the amplitude data to the amplitude modulator 320. It is the second predetermined condition that the position of the fingertip that performs operational input is within the predetermined area where the vibration is to be generated.

It is determined whether the position of the fingertip that performs operational input is within the predetermined area where the vibration is to be generated on the basis of whether or not the position of the fingertip that performs operational input is inside the predetermined area where the vibration is to be generated.

Here, the position on the display panel 160, such as the GUI operation unit to be displayed on the display panel 160, an area for displaying an image, or an area representing the entire page, is specified by area data indicating the area. The area data exists for all GUI operation units displayed on the display panel 160, areas for displaying an image, or areas representing the entire page in all applications.

Therefore, when it is determined whether the position of the fingertip that performs operational input is within the predetermined area where the vibration is to be generated as the second predetermined condition, a type of the application being activated by the electronic device 100 has relations. This is because the display on the display panel 160 differs depending on the type of the application.

In addition, it is because a type of operational input of moving the fingertip touching the surface of the top panel 120 differs depending on the type of application. As a type of operational input of moving the fingertip touching the surface of the top panel 120, for example, there is what is called flick operation when the GUI operation unit is operated. The flick operation is operation of moving the fingertip along the surface of the top panel 120 for a relatively short distance in a manner of flicking (snapping) the surface.

Furthermore, in a case of page turning, swipe operation is performed, for example. The swipe operation is operation of moving the fingertip along the surface of the top panel 120 for a relatively long distance in a manner of sweeping the surface. The swipe operation is performed in a case of turning a photo, for example, in addition to the page turning. Furthermore, in a case where a slider (see the slider 102B in FIG. 1) is slid by the GUI operation unit, drag operation of dragging the slider is performed.

The operational input of moving the fingertip touching the surface of the top panel 120, such as the flick operation, the swipe operation, and the drag operation given as examples here, is selectively used depending on the type of display based on the application. Therefore, when it is determined whether the position of the fingertip that performs operational input is within the predetermined area where the vibration is to be generated, the type of the application being activated by the electronic device 100 has relations.

The drive control unit 240 determines, using the area data, whether or not the position indicated by the positional data input from the driver IC 151 is inside the predetermined area where the vibration is to be generated.

Data in which data indicating a type of the application, area data indicating the GUI operation unit or the like on which operational input is made, and pattern data indicating a vibration pattern are associated with each other is stored in the memory 250.

In a case where the moving speed of the fingertip is equal to or higher than the predetermined threshold speed and coordinates of the operational input are inside the predetermined area where vibration is to be generated, the drive control unit 240 reads amplitude data indicating the amplitude value based on a type of the application and the coordinates from the memory 250, and outputs the amplitude data to the amplitude modulator 320.

The memory 250 stores the data in which data indicating a type of the application, area data indicating the GUI operation unit or the like on which operational input is made, and pattern data indicating a vibration pattern are associated with each other.

Furthermore, the memory 250 stores data and programs necessary for the application processor 220 to execute an application, data and programs necessary for the communication processor 230 to perform communication processing, and the like.

The sine wave generator 310 generates a sine wave necessary for generating the drive signal for vibrating the top panel 120 at the natural frequency. For example, in a case where the top panel 120 is caused to vibrate at the natural frequency f of 33.5 [kHz], the frequency of the sine wave is 33.5 [kHz]. The sine wave generator 310 inputs a sine wave signal in an ultrasonic band to the amplitude modulator 320.

The amplitude modulator 320 modulates the amplitude of the sine wave signal input from the sine wave generator 310 using the amplitude data input from the drive control unit 240, and generates the drive signal. The amplitude modulator 320 modulates only the amplitude of the sine wave signal in the ultrasonic band input from the sine wave generator 310, and generates the drive signal without modulating a frequency and a phase.

Hence, the drive signal output from the amplitude modulator 320 is a sine wave signal in the ultrasonic band obtained by modulating only the amplitude of the sine wave signal in the ultrasonic band input from the sine wave generator 310. Note that the amplitude of the drive signal is zero in the case where the amplitude data is zero. This is equivalent to a state in which the amplitude modulator 320 does not output a drive signal.

Next, data to be stored in the memory 250 will be described with reference to FIG. 18.

FIG. 18 is a table illustrating data to be stored in the memory 250. Application identification (ID) is illustrated as the data indicating the type of the application. Furthermore, formulae f1 to f4 representing a coordinate value of the area where the GUI operation unit or the like on which operational input is made is displayed are illustrated as the area data. Furthermore, P1 to P4 are illustrated as the pattern data indicating the vibration pattern.

Note that the application indicated by the application ID includes all applications that can be used on a smartphone terminal or a tablet computer, and also includes an email editing mode.

Next, processing executed by the drive control unit 240 of the drive control device 300 of the electronic device 100 according to the embodiment will be described with reference to FIG. 19.

Figure 19:
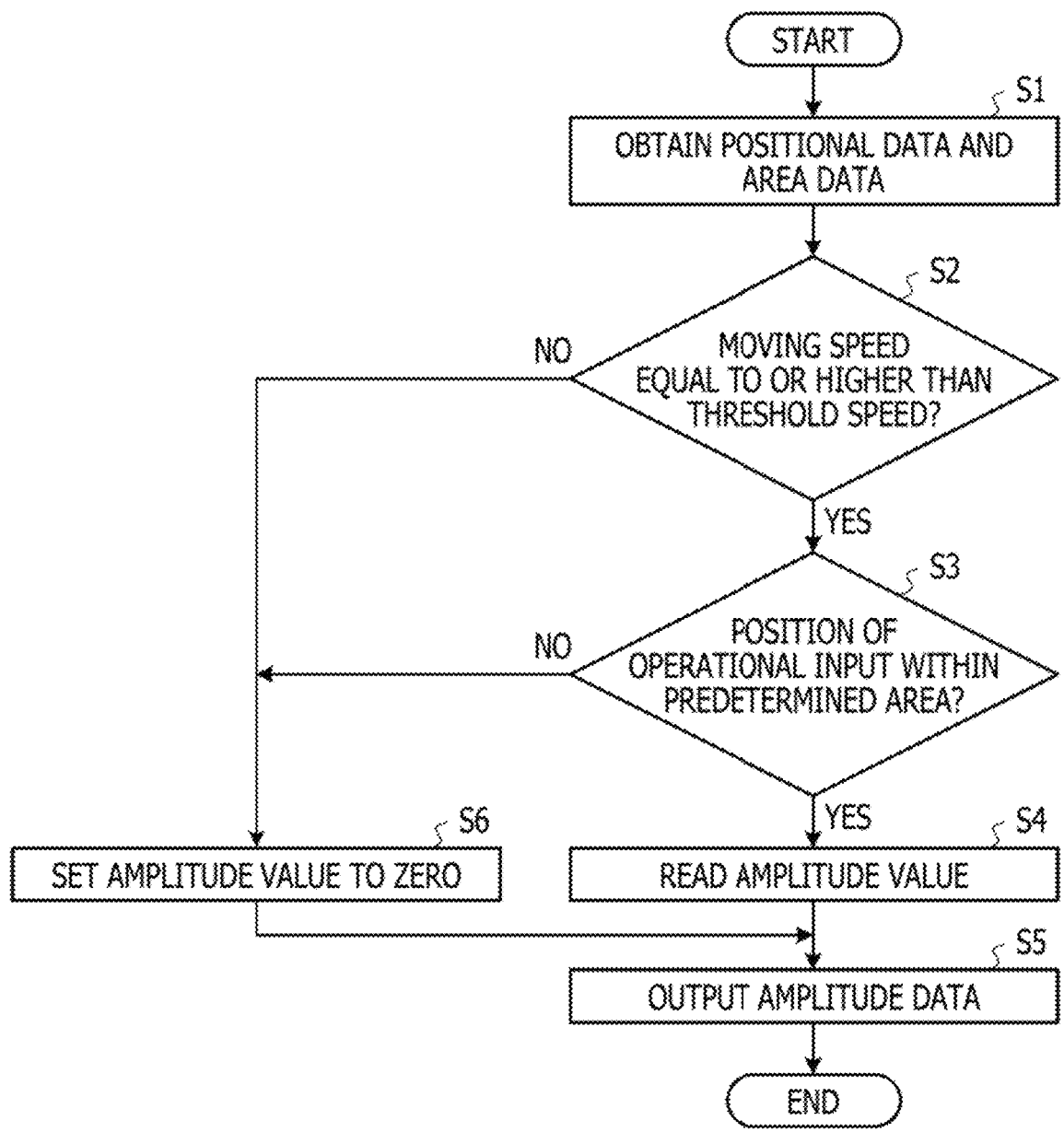
FIG. 19 is a flowchart illustrating processing executed by a drive control unit of a drive control device of the electronic device according to the embodiment.

FIG. 19 is a flowchart illustrating the processing executed by the drive control unit 240 of the drive control device 300 of the electronic device 100 according to the embodiment.

An operating system (OS) of the electronic device 100 executes control for driving the electronic device 100 for each predetermined control cycle. Accordingly, the drive control device 300 performs computing for each predetermined control cycle. The same applies to the drive control unit 240, and the drive control unit 240 repeatedly executes the flow illustrated in FIG. 19 for each predetermined control cycle.

The drive control unit 240 starts the processing when a power of the electronic device 100 is turned on.

The drive control unit 240 obtains area data associated with the vibration pattern for the GUI operation unit on which the current operational input is being made according to the coordinates indicated by the current positional data and the type of the current application (step S1).

The drive control unit 240 determines whether or not a moving speed is equal to or higher than a predetermined threshold speed (step S2). It is sufficient if the moving speed is calculated by vector operation. Note that it is sufficient if the threshold speed is set as a minimum speed of the moving speed of the fingertip at the time when operational input is made while moving the fingertip, such as what is called flick operation, swipe operation, and drag operation. Such a minimum speed may be set on the basis of experimental results, or may be set according to resolution of the touch panel 150 or the like.

If the drive control unit 240 determines that the moving speed is equal to or higher than the predetermined threshold speed in step S2, the drive control unit 240 determines whether or not a position of operational input is within an area St indicated by the area data obtained in step S1 (step S3).

If the drive control unit 240 determines that the coordinates representing the position of the operational input are in the area St represented by the area data obtained in step S1, the drive control unit 240 reads the amplitude data representing the amplitude value corresponding to the position of the operational input from the memory 250 (step S4).

The drive control unit 240 outputs the amplitude data (step S5). Therefore, the amplitude modulator 320 modulates amplitude of the sine wave output from the sine wave generator 310 to generate a drive signal, and the vibrating element 140 is driven.

On the other hand, if the moving speed is determined not to be equal to or higher than the predetermined threshold speed in step S2 (S2: NO), and if the coordinates representing the position of the operational input are determined not to be within the area St indicated by the area data obtained in step S1 in step S3, the drive control unit 240 sets the amplitude value to zero (step S6).

As a result, the drive control unit 240 outputs the amplitude data having the amplitude value of zero, and the amplitude modulator 320 generates a drive signal in which the amplitude of the sine wave output from the sine wave generator 310 is modulated to zero. Hence, the vibrating element 140 is not driven in this case.

Next, an operation example of the electronic device 100 according to the embodiment will be described with reference to FIGS. 20 and 21.

Figure 20:
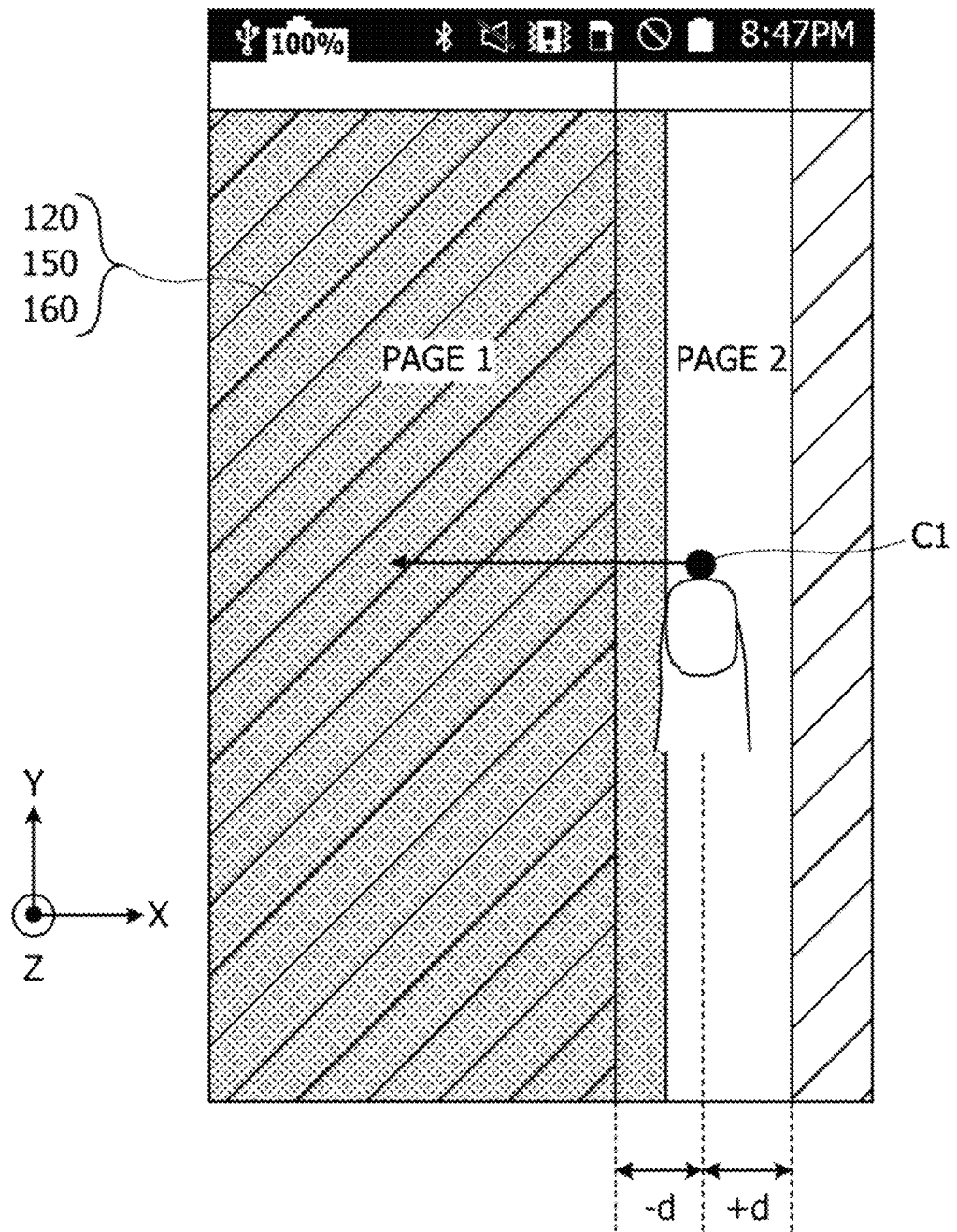
FIG. 20 is a diagram illustrating an operation example of the electronic device.
Figure 21:
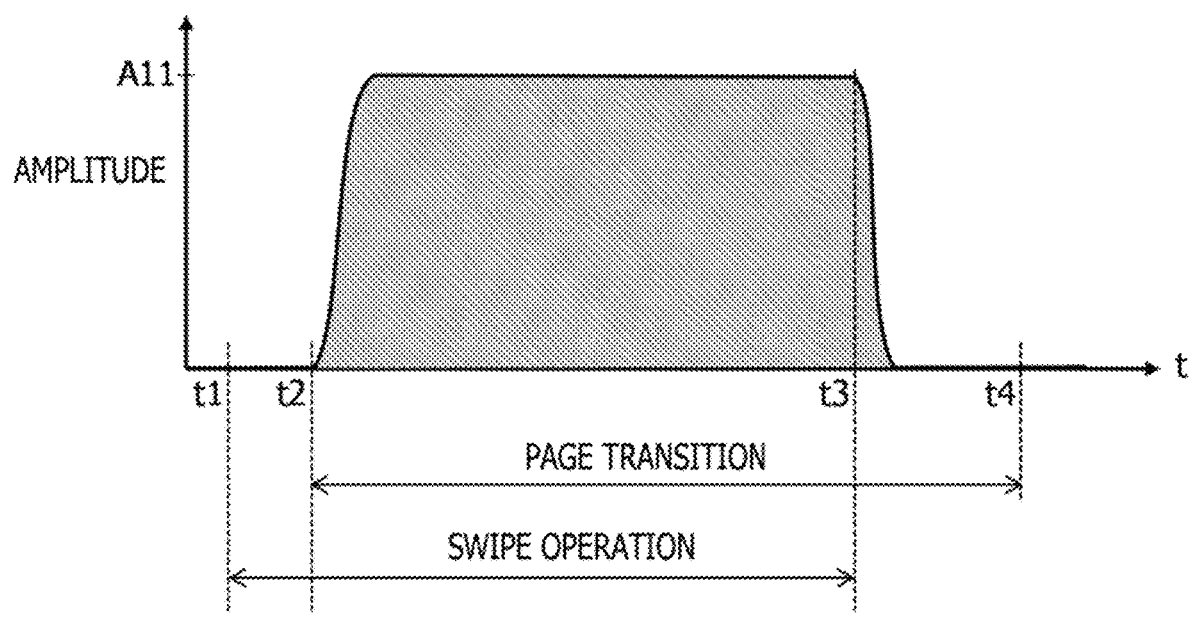
FIG. 21 is a graph illustrating the operation example of the electronic device.

FIGS. 20 and 21 are a diagram and a graph illustrating an operation example of the electronic device 100 according to the embodiment. In FIGS. 20 and 21, XYZ coordinates similar to those in FIGS. 2 to 4 are defined.

FIG. 20 is a plan view illustrating the top panel 120, the touch panel 150, and the display panel 160, and the user of the electronic device 100 touches a first page illustrated in gray with his/her fingertip and performs swipe operation leftward to open a second page illustrated in white. In other words, the display of the electronic device 100 is about to transition from the first page to the second page.

In the operation mode of performing operation of turning the page as in this case, the drive control unit 240 determines whether the operational input is swipe operation. For example, the drive control unit 240 determines that the swipe operation is performed if the user's fingertip has moved td mm or more in the X-axis direction from a position where the fingertip has first touched the top panel 120, and vibration is generated in the top panel 120 when the fingertip has entered an area indicated by oblique lines. The area Indicated by the oblique lines is the area St.

Here, vibration generated in the top panel 120 by the drive signal output from the amplitude modulator 320 on the basis of the amplitude data output from the drive control unit 240 in a case where the operational input is made as illustrated in FIG. 20 will be described with reference to FIG. 21. In FIG. 21, a horizontal axis represents a time axis, and a vertical axis represents an amplitude value of the amplitude data. Furthermore, the moving speed of the fingertip when the user performs swipe operation is assumed to be substantially constant here.

It is assumed that the user starts to move the fingertip touching a position C1 of the top panel 120 leftward at time t1. Then, at time t2 when a distance d mm is moved from the position C1, the drive control unit 240 determines that the user's input operation is swipe operation, and performs driving with a swipe vibration pattern. The operation distanced mm used to determine the swipe operation corresponds to the moving distance of the fingertip between times t1 and t2. Furthermore, page transition starts at time t2.

The swipe vibration pattern is a drive pattern in which the amplitude is A11 and vibration continues during the swipe operation.

When the user releases the fingertip from the top panel 120 to end the swipe operation at time t3, the drive control unit 240 sets the amplitude value to zero. Accordingly, the amplitude becomes zero immediately after time t3. Furthermore, the page transition is complete at time t4 after time t3.

In this manner, in a case where the user performs swipe operation to turn the page, as an example, the drive control unit 240 outputs amplitude data having a constant amplitude (A11). Therefore, while the user is performing swipe operation, the dynamic friction force applied to the user's fingertip decreases so that a sense of slipping of the fingertip can be provided to the user, whereby the user can sense that the swipe operation is received by the electronic device 100 with his/her fingertip.

Note that the vibration pattern in the case where the user performs the swipe operation to turn the page has been described with reference to FIGS. 20 and 21. However, even in a case where what is called flick operation or operation of moving the fingertip along the surface of the top panel 120 is performed, various kinds of tactile sensation can be provided to the user with the vibrating element 140 being driven.

More specifically, the intensity of the natural vibration may be changed when the position of the operational input moves across the boundary of the GUI operation unit, such as the button 102A (see FIG. 1) displayed on the display panel 160, or when the position of the operational input moves while the GUI operation unit is operated. Furthermore, when the position of the operational input moves within the area of the GUI operation unit of the slider 102B (see FIG. 1) displayed on the display panel 160, the intensity of the natural vibration may be changed according an operation amount of the slider 102B, or may be changed when a scale of the slider 102B is reached.

As described above, according to the electronic device 100 of the embodiment, the ultrasonic wave radiated from the surface of the top panel 120 and the ultrasonic wave reflected by the top panel 120 weaken each other because the reflected wave from the reflector 180 returns to the same point.

Therefore, it is possible to provide the electronic device 100 that suppresses radiation of ultrasonic waves.

Furthermore, it is sufficient if the reflector 180 is disposed so that the intersection O substantially coincides with the node of the standing wave generated in the top panel 120 or the point outside the top panel 120 and separated from the node by $\lambda p/2 \times M$ (M is an arbitrary positive integer) in the direction in which the amplitude of the standing wave fluctuates (Y-axis direction).

Therefore, the reflector 180 can be disposed either between both ends of the top panel 120 in the Y-axis direction or outside of both the ends, and various forms of the reflector 180 can be realized by increasing the degree of freedom of arranging the reflector 180.

Furthermore, it suffices if the angle between the reflective surface 180A of the reflector 180 and the surface 120A of the top panel 120 is about $(90-\theta)$ degrees, the distance PQ is about $(\lambda a/2) \times (N+\frac{1}{2})$, and the intersection O substantially coincides with the point separated by $\lambda p/2 \times M$ from the center point of the node of the top panel 120. As described above, the angle between the reflective surface 180A and the surface 120A, the distance PQ, and the position of the intersection O are given a range that allows a manufacturing error.

Therefore, even if a certain manufacturing error occurs, the ultrasonic waves radiated from the top panel 120 can be weakened, and the electronic device 100 that suppresses the radiation of the ultrasonic waves can be provided.

Furthermore, according to the electronic device 100 of the embodiment, the natural vibration in the ultrasonic band of the top panel 120 is generated to change the dynamic friction force applied to the user's fingertip, whereby favorable tactile sensation can be provided to the user.

Note that, although the form in which the reflector 180 is the tabular member has been described above, the present invention is not limited to such a configuration. The electronic device 100 only needs to include the reflecting unit having the reflective surface 180A that satisfies conditions that the angle formed by the reflective surface 180A and the surface 120A of the top panel 120 is about (90−θ) degrees and the distance PQ is about (λa/2)×(N+½). The reflector 180 may be integrated with the housing 110, or may be a part of a member such as a device for attaching the electronic device 100.

Further, although the form in which the electronic device 100 includes the display panel 160 has been described above, the electronic device 100 does not have to include the display panel 160.

Figure 22:
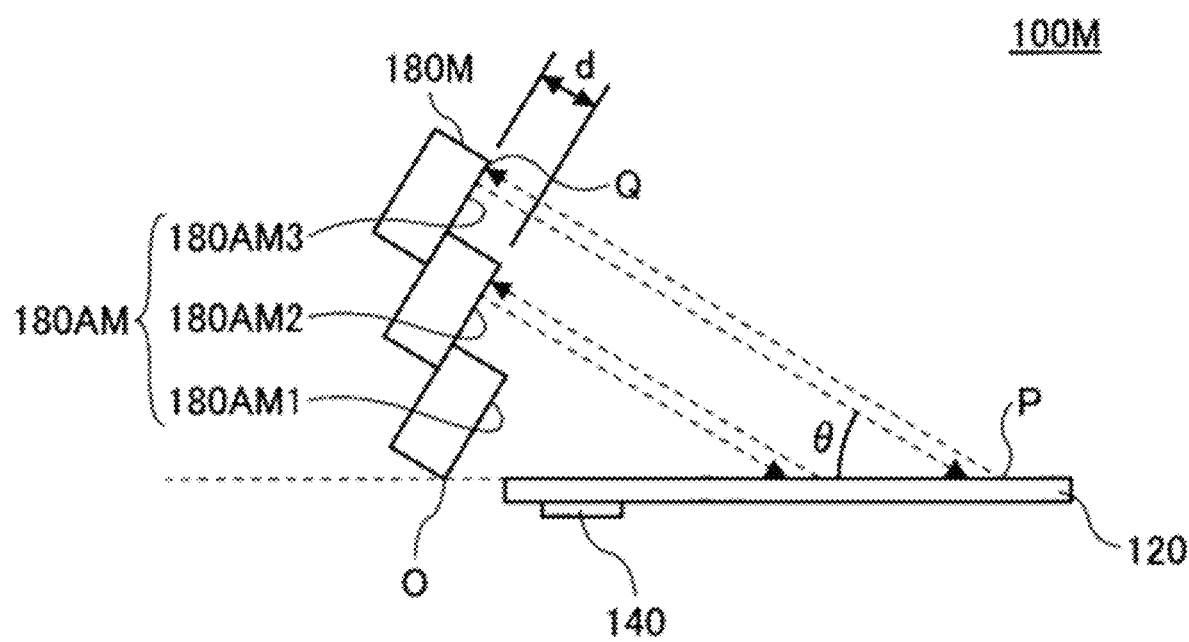
FIG. 22 is a diagram illustrating an electronic device according to a modification of the embodiment.

Further, in the above, the form in which the reflective surface 180A of the reflector 180 is one plane has been described. However, a structure having a step may be used as in a reflector 180M illustrated in FIG. 22. FIG. 22 is a diagram illustrating an electronic device 100M according to a modification of the embodiment. In FIG. 22, only the top panel 120, the vibrating element 140, and the reflector 180M are illustrated, and the other components are omitted.

The reflector 180M has a reflective surface 180AM. The reflective surface 180AM has sub-reflective surfaces 180AM1, 180AM2, and 180AM3. The reflector 180M has the sub-reflective surfaces 180AM1, 180AM2, and 180AM3 arranged in a three-step staircase pattern. The reflector 180M has such a staircase pattern and has a configuration that does not overlap with the top panel 120 in a plan view.

The sub-reflective surfaces 180AM1, 180AM2, and 180AM3 are parallel to each other, with the sub-reflective surface 180AM1 closest to the top panel 120 and the sub-reflective surface 180AM3 farthest from the top panel 120. Note that the intersection O is at a position of a line of intersection between the sub-reflective surface 180AM1 and the surface 120A of the top panel 120 in a YZ plan view.

An angle between a direction perpendicular to the sub-reflective surfaces 180AM1, 180AM2, 180AM3 (normal direction) and the surface 120A of the top panel 120 is θ. The angle θ satisfies the formula (3).

The sub-reflective surfaces 180AM1, 180AM2, and 180AM3 have a configuration in which a step d in a direction of the angle θ from the surface of the top panel 120 is set to T×λa/2. T is any positive integer.

Therefore, similar to the reflector 180 illustrated in FIG. 12, ultrasonic waves radiated from the surface 120A of the top panel 120 can be weakened.

Since the reflective surface 180AM is divided into the three sub-reflective surfaces 180AM1, 180AM2, and 180AM3, it can be easily installed in a device or the like Including the electronic device 100M. Furthermore, since the reflector 180M does not overlap with the top panel 120 in a plan view, visibility of the display panel 160 on a back side of the top panel 120 is good.

Note that, as an example, such a reflector 180M has a shape in which the three members are combined with the steps, but the present invention is not limited to such a configuration. The number of steps and sub-reflective surfaces may be any number. Furthermore, the reflective surface may be divided into sub-reflective surfaces having a step in an X-axis direction.

Although the electronic device according to the exemplary embodiment of the present invention has been described above, it should be understood that the present invention is not limited to the embodiment disclosed in detail, and the various changes and alterations could be made hereto without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
    a top panel with an operation surface;
    a coordinate detector that detects coordinates of operational input performed on the operation surface;
    a vibrating element that generates vibration on the operation surface;
    a drive controller that drives the vibrating element with a drive signal that generates natural vibration in an ultrasonic band on the operation surface, the drive controller driving the vibrating element so that intensity of the natural vibration changes depending on a position of the operational input on the operation surface and a degree of temporal change in the position; and
    a reflector disposed on the operation surface side of the top panel and having a reflective surface that reflects ultrasonic waves radiated from the top panel,
    when a wavelength of a standing wave generated in the top panel by the natural vibration is $\lambda p$, a wavelength of an ultrasonic wave in the air at a frequency in the ultrasonic band of the drive signal is $\lambda a$, an angle that satisfies $\cos\theta = \lambda a/\lambda p$ is $\theta$, and N is an arbitrary positive integer,
    the reflective surface is tilted toward the operation surface by forming an angle of (90−θ) degrees between the reflective surface and the operation surface, and
    a distance between a first point on an antinode of the natural vibration and a second point on the respective surface lowered perpendicular to the reflective surface from the first point is $(\lambda a/2)\times(N+1/2)$.

2. The electronic device according to claim 1, wherein a position of a line of intersection between the operation surface and the reflective surface in a side view is a node of the standing wave generated in the top panel or a point outside the top panel and separated from the node by $\lambda p/2 \times M$ (M is an arbitrary positive integer) in a direction in which amplitude of the standing wave fluctuates.

3. The electronic device according to claim 1, wherein the the reflective surface includes a plurality of sub-reflective surfaces which are arranged in a staircase pattern, and
    a length of a thickness of each of the plurality of sub-reflective surfaces is $(\lambda a/2)\times K$ (K is an arbitrarily positive integer).

4. The electronic device according to claim 3, wherein the reflector is offset so as to be separated from the top panel by the step in a side view so as not to overlap the top panel in a plan view.

5. The electronic device according to claim 1, wherein the (90−θ) degrees is within a range from (90−(θ+2.5)) degrees to (90−(θ−2.5)) degrees.

6. The electronic device according to claim 1, wherein the $(\lambda a/2) \times (N+1/2)$ means that the distance is within a range from $(\lambda a/2) \times (N+1/2) - \lambda a/8$ to $(\lambda a/2) \times (N+1/2) + \lambda a/8$.

* * * * *